US010460473B1

(12) United States Patent
McMichael et al.

(10) Patent No.: US 10,460,473 B1
(45) Date of Patent: Oct. 29, 2019

(54) CAMERA CALIBRATION SYSTEM

(71) Applicant: Zoox, Inc., Foster City, CA (US)

(72) Inventors: Ryan McMichael, Mountain View, CA (US); Till Kroeger, San Francisco, CA (US); Robert Nicholas Moor, San Mateo, CA (US); Maxwell Yaron, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/221,215

(22) Filed: Dec. 14, 2018

(51) Int. Cl.
G06T 7/80 (2017.01)
H04N 17/00 (2006.01)
G06T 7/70 (2017.01)
G06T 7/33 (2017.01)

(52) U.S. Cl.
CPC .................. G06T 7/80 (2017.01); G06T 7/33 (2017.01); G06T 7/70 (2017.01); H04N 17/002 (2013.01)

(58) Field of Classification Search
CPC ........... H04N 17/002; G06T 7/80; G06T 7/33; G06T 7/70
USPC ....... 348/187, 180, 175, 177, 46, 47, 48, 49, 348/50, 65, 706, 714, 719, 725
See application file for complete search history.

(56) References Cited

U.S. PATENT DOCUMENTS

| 8,896,671 B2* | 11/2014 | Jayaram | H04N 5/2253 348/48 |
| 2010/0188486 A1* | 7/2010 | Amanullah | G01N 21/8806 348/48 |
| 2011/0187827 A1* | 8/2011 | Porter | H04N 13/128 348/46 |
| 2011/0310226 A1* | 12/2011 | McEldowney | G01B 11/2513 348/46 |
| 2013/0265442 A1* | 10/2013 | Maekawa | H04N 17/002 348/187 |
| 2013/0307950 A1* | 11/2013 | Aharon | A61B 5/0077 348/65 |
| 2015/0381965 A1* | 12/2015 | Atanassov | H04N 5/23245 348/47 |
| 2016/0127714 A1* | 5/2016 | Hazeghi | G02B 27/0075 348/46 |
| 2016/0267657 A1* | 9/2016 | Gupta | H04N 17/00 |
| 2018/0075593 A1* | 3/2018 | Wang | G06T 7/85 |
| 2018/0086284 A1* | 3/2018 | Gupta | G03B 43/00 |

* cited by examiner

Primary Examiner — Jefferey F Harold
Assistant Examiner — Mustafizur Rahman
(74) Attorney, Agent, or Firm — Lee & Hayes, P.C.

(57) ABSTRACT

Techniques for calibrating a camera utilizing a calibration station. The camera calibration station may be configured to emit collimated light toward a camera housed in a cradle. The camera may capture images of the collimated light at pre-determined positions throughout a calibration sequence. A computing system associated with the camera calibration station may utilize reference locations determined based on the collimated light at the pre-determined positions compared to measured locations of the collimated light at the pre-determined positions to determine intrinsics of the camera (e.g., focal length of lens, optical center of lens, etc.) and an error associated therewith. Based at least in part on the error being less than a threshold error, the computing system may store the intrinsic parameters of the camera.

20 Claims, 10 Drawing Sheets

CAMERA CALIBRATION SYSTEM

BACKGROUND

Camera systems are often used in the operation and control of autonomous, semi-autonomous, and manned vehicles. To use the camera systems in the operation and control of the vehicles, the camera systems often must first be calibrated. Traditionally, camera calibration may be performed by capturing calibration images located on a flat surface at known positions relative to the camera to optimize for the geometry of the lens. Determinations of camera intrinsic parameters using such techniques requires accurate knowledge of relative poses (positions and orientation) between the camera and the surface, whether determined a prior and/or determined as additional optimization parameters, requiring additional compute. Such required relative motions may be complex, time consuming relative motions, and, in some instances, require manual movement.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4A illustrates measured points of light at various positions of the camera. FIG. 4B illustrates angle space points associated with reference points of light at various angles of the camera.

FIG. 4C illustrates point residuals associated with the passing results.

FIG. 5A illustrates measured points of light at various positions of the camera. FIG. 5B illustrates angle space points associated with reference points of light at various angles of the camera. FIG. 5C illustrates point residuals associated with the failing results.

DETAILED DESCRIPTION

Figure 1:
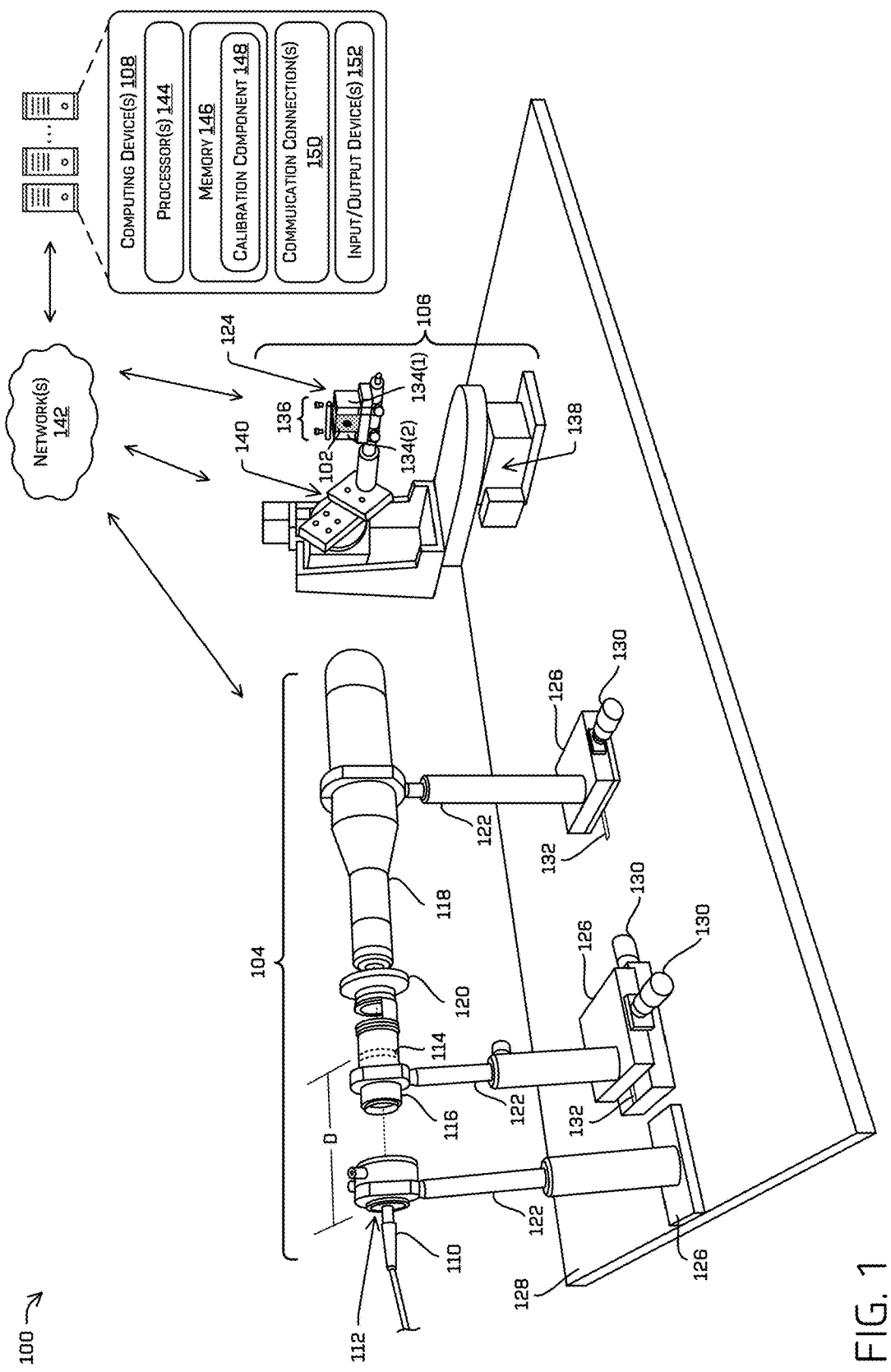
FIG. 1 is a perspective side view of an example calibration system used to calibrate a camera in accordance with the techniques described herein.

This disclosure is directed to improved techniques for camera calibration utilizing a camera calibration station. The camera calibration station may be configured to emit collimated light toward a camera housed in a cradle. The camera may capture images of the collimated light (e.g., as may be focused by the camera lens) at pre-determined positions (e.g., angles with respect to the light) throughout a calibration sequence. A computing system associated with the camera calibration station may use reference/expected (e.g., predetermined/precalculated) locations of the focused light in the image (e.g., given an estimated lens distortion) compared to measured locations of the focused light in the image to optimize a parameter of the camera lens. The computing system may additionally determine intrinsics (e.g., intrinsic characteristics) of the camera (e.g., focal length of lens, optical center of lens, etc.) and a residual error associated therewith. At least because the camera calibration system described herein includes optimizing for fewer parameters than what is required with traditional models, the camera calibration system described herein improves upon traditional camera calibration techniques. Additionally, the camera calibration system described herein may be configured to perform optimization more rapidly than traditional techniques due to the reduced number of parameters required to be solved for.

The calibration station may include a light source section and a camera section. The light source section may include a light source coupled to a first end of the light source section. The first end of the light source section may be the end situated distal to the camera section. The light source may be configured to emit a source of collimated light. As one example, the light source may include a fiber optic cable, a bulb, a laser, or any other light source configured to produce light. Light from the light source may travel through a hole (e.g., pin hole) located in the first end of the light source section toward a lens, in which the light is collimated. A distance between the light source (e.g., from the pin hole) may be based on a focal length of lens used in the light source section. For example, a light source section including a 50-millimeter lens would also include a distance of about 50 millimeters from the light source to the lens. For another example, a light source section including a 100-millimeter lens would include a distance of about 100 millimeters from the light source to the lens.

In various examples, the light source section may include a beam expander. In such examples, the beam expander may expand a size of the collimated beam of light after it has passed through the lens. In some examples, the light source section may include a second tube through which the collimated beam of light may travel after passing through the lens. In such examples, the second tube may include a tube of substantially uniform diameter. For example, a light section comprising a 200-millimeter lens may include a second tube of substantially uniform diameter in lieu of a beam expander based at least in part on a size of the lens. In some examples, the beam expander and/or the second tube may be configured to decrease a divergence of the collimated light.

Though described above as a single example for providing collimated light, any other method is contemplated. As another non-limiting example, a laser may be used. Such an example, however, may not have issues due to chromatic effects, speckle, etc.

The light source section may emit the collimated light (with a low divergence) toward the camera section. The camera section may include a cradle for housing a camera during the calibration sequence. In some examples, the camera section may include a rotation point for azimuth and a rotation point for elevation. In such examples, the camera section may be configured to adjust an azimuth and/or elevation of the camera housed in the cradle during the calibration sequence. Regardless of rotation of the camera, the cradle may position the camera such that the collimated light source always enters the camera lens at a same point.

In various examples, the calibration sequence may be directed by the computing system associated with the calibration system. In such examples, the computing system may cause the camera section to adjust a position of the camera to predetermined positions (e.g., corresponding azimuth and elevation, angles with respect to the collimated light) during the calibration sequence. In some examples, upon starting the calibration sequence, the camera section may be configured to center the collimated light in the image plane of the camera (e.g., by moving the camera until the focused light is in a center position on the image). The camera section may then move the camera to the predetermined positions by adjusting an azimuth and elevation (e.g., angle with respect to the collimated light) of the camera. In some examples, the azimuth and elevation of the camera may be measured relative to a centered point (e.g., collimated light centered in the image plane).

In some examples, the computing system may determine reference horizontal and vertical locations of the collimated light as predicted from an angle at the predetermined positions. A reference location (e.g., horizontal and vertical location) of the collimated light may include expected location of the collimated light corresponding to a particular predetermined position. In various examples, the reference horizontal and vertical locations of the collimated light may be based, at least in part, on the lens associated with the camera.

In some examples, the computing system may cause the camera to capture the images of the collimated light at the predetermined positions in the calibration sequence. The images may include a position (e.g., horizontal location, vertical location, angle, etc.) of the focused collimated light as viewed by the camera (which may comprise a centroid of the light as focused on the image plane). The camera may capture the images and may send the captured images of the collimated light to the computing system. In at least one example, the camera may send a video feed of the images as they are captured.

The computing system may perform optimization (e.g., using gradient descent, non-linear least squares, etc.) using the location of the light in the captured images and the reference locations to determine camera intrinsics (e.g., intrinsic characteristics/parameters of the camera). The camera intrinsics may include at least a focal length of the lens, and an optical center of the lens. In various examples, the computing system may determine a distortion model (e.g., polynomial, field of view, radial, etc.) to apply in the optimization. In some examples, the distortion model may be based, at least in part, on a type of lens associated with the camera. For example, an optimization of an ultra-wide-angle lens (e.g., fish eye lens) may include a field of view distortion model. For another example, an optimization of a narrow angle lens may include a polynomial distortion model. In the examples in which the distortion model is determined by the system, the system may optimize for several lens distortion models and return the intrinsics for that model having the lowest error.

In some examples, the computing system may apply the distortion model to the reference and measured locations of the collimated light to calculate the camera intrinsics. In various examples, the computing system may distort the reference locations by applying different (e.g., varying) distortion parameters (e.g., radial, prismatic, decentering, etc.) to match the distorted reference locations to the measured locations (e.g., optimization). In some examples, the computing system may undistort the measured locations to fit the undistorted measured locations to the reference locations using different distortion parameters. In various examples, the computing system may adjust the distortion parameters to make the reference locations fit the measured locations, or vice versa, until reaching one or more stopping criteria. The stopping criteria may include determining that an error between the reference locations and the measured locations is minimized (e.g., below a threshold), computing a predetermined number or iterations, determining that a rate of change between iterations is below a threshold, or the like.

In various examples, the computing system may determine a minimized residual error associated with the optimization calculations (e.g., fitting the reference locations to the measured locations or vice versa). In various examples, the computing system may determine, based on the minimized residual error, whether a camera passes or fails a calibration sequence. In examples in which the camera passes, the camera may be utilized, with known intrinsics (e.g., distortion parameters), to accurately determine a location of objects captured in an image by the camera. In at least one example, the camera may subsequently be mounted on a vehicle, such as, for example, an autonomous vehicle, for use in operation and control of the autonomous vehicle.

FIG. 1 is a perspective side view of an example calibration system 100 used to calibrate a camera 102 in accordance with the techniques described herein. The calibration system 100 may include a light source section 104, a camera section 106, and one or more computing devices 108. The light source section 104 may be configured to produce a collimated beam of light having a particular diameter. Depicted in FIG. 1 is a particular configuration, though any other source capable of producing collimated light is contemplated (e.g., a laser, etc.). The light source section 104 may include a light source 110 configured to couple to a first segment 112 of the light source section 104. The first segment 112 of the light source section 104 may be distal to the camera section 106. The light source 110 may include a fiber optic cable, a bulb, a laser, or any other source of light. In some examples, the light source 110 may be determined based on a camera 102 to be calibrated. In such examples, the light source 110 may be determined based on a wavelength of the light emitted therefrom. For example, if calibrating an infra-red camera, the light source 110 may emit a light with a wavelength in the infra-red spectrum (e.g., infra-red light). In various examples, light from the light source 110 may enter the light source section 104 via a hole in the first segment 112. In some examples, the hole may include a pinhole with a diameter between about 5 micrometers and about 200 micrometers. In various examples, the hole may spatially filter a beam of light from the light source 110 toward a lens 114.

In some examples, the lens 114 may be housed in a lens tube 116 of the light source section 104. Though depicted in FIG. 1 as being in the center of lens tube 116 for illustrative purposes, such a depiction is not meant to be so limiting. The lens 114 may be at any point along lens tube 116 such that the lens 114 is a distance D away from the light source 110 (or aperture through which the light source 110 passes). In various examples, the lens tube 116 may be configured to limit divergence of light from the light source 110 prior to the light reaching the lens 114. In various examples, a diameter of the lens tube 116 may be determined based on a size of the lens 114 (e.g., diameter of the lens 114). As illustrated in FIG. 1, the lens 114 may be axially aligned with a point at which the light source 110 enters the first segment 112 (e.g., the hole). In various examples, a distance D from the point at which the light source 110 enters the first segment 112 to the lens 114 may be about the focal length of the lens 114. For example, a distance D of a light source section 104 with a 50-millimeter lens may be about 50 millimeters. In some examples, light from the light source 110 may diverge over the distance D. In some examples, the lens 114 may be configured to collimate the light from the light source 110.

In various examples, the lens tube 116 may include one or more filter holders (not illustrated). The filter holder(s) may be configured to house one or more filters (e.g., wavelength filters, color filters, polarizing filters, neutral density filters, etc.). In various examples, the filter(s) may be determined based on a type of camera to be calibrated, a type of lens associated with the camera, or the like.

Additionally or in the alternative, the light source section 104 may include a baffle configured to collimate the light (e.g., collimating device). In some examples, the lens tube 116 may include the baffle. In some examples, the lens tube 116 may include ribs configured to trap diverging light. In such examples, light exiting the lens tube 116 may be substantially collimated. In various examples, the light source section 104 may additionally or alternatively include any other type of collimating device, such as that configured to receive substantially divergent light beams and convert them into substantially parallel light beams.

In various examples, the light may pass through the collimating device (e.g., lens 114, baffle, etc.) into a beam tube 118. In some examples, the beam tube 118 may include a tube of substantially the same diameter (e.g., a cylinder). In the illustrative example, the beam tube 118 includes a beam expander including sections of different diameters. In some examples, the beam expander may be configured to increase the diameter of the collimated light. In other examples, the beam expander may be configured to decrease the diameter of the collimated light. In some examples, the beam tube 118 may be configured to decrease a divergence of the collimated light coming through the lens 114.

In various examples, the size and/or shape of the beam tube 118 (e.g., substantially the same diameter or sections of different diameters) may be based on a focal length of the lens 114. For example, a light source section 104 including a 200-millimeter lens 114 may be configured to focus light to have a low divergence. Additionally, the 200-millimeter lens may provide a wide viewing surface for the camera 102 to capture images of the light source 110 at various positions during a calibration sequence. Accordingly, the beam tube 118 may include tube of a substantially constant diameter. For another example, a light source section 104 with a 50-millimeter lens 114 may include a beam tube 118 including sections of different diameters. In such an example, the beam tube 118 may comprise a beam expander.

In various examples, the light source section 104 may include a diaphragm 120 situated between the lens 114 and the beam tube 118. In some examples, the diaphragm 120 may be configured to decrease divergence of the collimated light after passing through the lens. In some examples, the diaphragm 120 may be configured to limit an amount of light transmitted to the camera 102 during the calibration sequence. In various examples, the diaphragm may include an iris diaphragm, a lever activated iris, or other type of diaphragm configured to limit and amount of light and/or decrease a divergence of light passing through the diaphragm 120.

As illustrated in FIG. 1, the first segment 112, the lens tube 116, and/or the beam tube 118 may be coupled to one or more support arms 122. In some examples, the support arm(s) 122 may be fixed at a set height. In the illustrative example, the support arm(s) 122 are adjustable. In such an example, the support arm(s) 122 may be raised and/or lowered based on a height of the camera section 106, a type of camera 102 to be calibrated, a size lens 114, or the like. In some examples, the support arm(s) 122 may provide a means by which the light source section 104 may be aligned with a camera 102 housed in a cradle 124 of the camera section 106.

In various examples, the support arm(s) 122 may be coupled to one or more mounts 126. The mount(s) 126 may be fixed and/or adjustable on a base 128 of the calibration station. In some examples, the mount(s) 126 may be adjustable in one or more dimensions. In such examples, the mount(s) 126 may be adjusted via one or more adjustment mechanisms 130. Though illustrated as screw-type adjustment mechanisms, the adjustment mechanism(s) 130 may include any type of mechanical adjustment mechanisms, such as spring-type adjustment mechanisms, clamp type adjustment mechanisms, or the like. In various examples, the adjustment mechanism(s) 130 may be released, and a position of the mount(s) 126 may be adjusted. In some examples, the mount(s) 126 may be adjustable along an axis of the light source section 104 and/or perpendicular to the axis of the light source section 104. For example, and as illustrated in FIG. 1, a mount 126 corresponding to a support arm 122 coupled to a lens tube 116 may be configured to be adjusted along an axis of the light source section 104 and perpendicular to the axis of the light source section 104. Additionally, a mount 126 corresponding to a support arm 122 coupled to a beam tube 118 may be configured to be adjusted along the axis of the light source section 104. A support arm 122 coupled to a first segment 112, conversely, may be coupled to a fixed mount 126.

In the illustrative example, the mount(s) 126 may be released via the adjustment mechanism(s) 130 and slid along a track 132. In other examples, the mount(s) 126 may be released and coupled to the base 128 via other mechanical couplings, such as threaded holes, non-threaded holes, ball and socket joints, clamps, or the like. In various examples, the adjustable mount(s) 126 and/or adjustable support arm(s) 122 may permit the use of different light source sections 104 for camera calibration. In such examples, the calibration system 100 may be configured to calibrate cameras 102 of different sizes and/or types. Although the components of the light source section 104 and the camera section 106 are illustrated as being adjustable relative to the base 128, it is understood that, in some examples, the components of the light source section 104 and/or the camera section 106 may be fixed in a housing. In some examples, the components of the light source section 104 and/or the camera section 106 may be configured to stand alone, and thus may not be coupled to a base 128. In such examples, the components may rest on a surface throughout the calibration sequence.

To calibrate a camera 102, the light source section 104 may be positioned to emit the collimated light toward the cradle 124 of the camera section 106. The cradle 124 may be configured to house the camera 102. In some examples, the cradle 124 may be adjustable to fit cameras 102 of different sizes and/or shapes. In such examples, a first support 134(1) and/or a second support 134(2) of the cradle 124 may be adjustable. As illustrated in FIG. 1, the first support 134(1) may be adjustable and a second support 134(2) may be fixed. In other examples, the first support 134(1) may be fixed and the second support 134(2) may be adjustable. In yet other examples, both the first support 134(1) and the second support 134(2) may be adjustable.

In some examples, the camera 102 may be housed in the cradle 124 and secured via a fastening mechanism 136. In the illustrative example, the fastening mechanism 136 may include a plate and two fasteners (e.g., screws, bolts, rivets, etc.). In other examples, the fastening mechanism 136 may include any other type of mechanical fasteners, such as clamping mechanisms, spring-type mechanisms, or the like.

As illustrated in FIG. 1, the camera section 106 may include an azimuth rotation point 138 (e.g., yaw) and an elevation rotation point 140 (e.g., pitch). The azimuth rotation point 138 may be configured to adjust an azimuth of the camera 102. The elevation rotation point 140 may be configured to adjust an elevation of the camera 102. In various examples, the azimuth and the elevation of the camera 102 may be measured with respect a distance from a center point (e.g., light centered on lens of camera 102). In various examples, the camera section 106 may additionally or alternatively include a roll rotation point configured to adjust a roll angle of the camera 102 during the calibration sequence. Throughout any rotation of the camera 102, the camera cradle 124 may be designed such that collimated light may enter a substantially similar point (e.g., a center of an entrance lens) of the camera.

In various examples, the computing device(s) 108 may be communicatively coupled to the light source section 104, the camera section 106 and/or the camera 102 via one or more networks 142. The network(s) 142 may include wired and/or wireless (e.g., Bluetooth, WiFi, cellular, etc.) network(s) 142. The computing device(s) 108 may include one or more processors 144 and memory 146 communicatively coupled with the one or more processors 144. The processor 144 may be any suitable processor capable of executing instructions to process data and perform operations as described herein. By way of example and not limitation, the processor(s) 144 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 146 may include a non-transitory computer-readable media. The memory 146 may store an operating system and one or more software applications, instructions, programs, and/or data to implement the methods described herein and the functions attributed to the calibration system. In various implementations, the memory 146 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 146 may include at least a working memory and a storage memory. For example, the working memory may be a high-speed memory of limited capacity (e.g., cache memory) that is used for storing data to be operated on by the processor(s) 144. In some instances, the memory 146 may include a storage memory that may be a lower-speed memory of relatively large capacity that is used for long-term storage of data. In some cases, the processor(s) 144 cannot operate directly on data that is stored in the storage memory, and data may need to be loaded into a working memory for performing operations based on the data, as discussed herein.

In the illustrative example, the memory 146 stores a calibration component 148. In various examples, the calibration component 148 may be configured to manage a calibration sequence for calibrating the camera 102. In such examples, the computing device(s) 108 and/or the calibration component 148 may be configured to communicate with the camera 102, the light source section 104, and/or the camera section 106, such as via one or more communication connections 150.

The communication connection(s) 150 may include physical and/or logical interfaces for connecting the computing device(s) 108 to one or more other computing devices and/or remote components, such as the camera 102, the light source section 104 and/or the camera section 106. For example, the communications connection(s) 150 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s) and/or components of the calibration system 100.

Additionally, the computing device(s) 108 and/or the calibration component 148 may be configured to receive input from an operator, such as via one or more input/output devices 152. The input/output devices 152 may include speakers, a microphone, and various user controls (e.g., buttons, a joystick, a keyboard, a keypad, etc.), and so forth. In various examples, the operator may input one or more known parameters of the camera 102. The known parameter(s) of the camera 102 may include a lens type, a lens size, a point of convergence of the lens, horizontal field of view, vertical field of view, exposure (i.e., aperture, shutter speed, ISO speed), and/or any other known parameters of the camera 102 that may be used in calibration.

In some examples, the calibration component 148 may process the known parameter(s) and determine camera positions associated with the calibration sequence. The camera positions may include positions to which the camera section 106 adjusts the camera 102 through the calibration sequence, such as via the azimuth rotation point 138 and/or the elevation rotation point 140. In various examples, the camera positions may be determined based on an angle between the camera and the collimated light. In some examples, the calibration component 148 may process the known parameters to determine the camera positions based on an instruction, such as from the operator, to begin the calibration sequence. In various examples, the calibration component 148 may receive the instruction from the operator to begin the calibration sequence and responsive to the instruction, may send a signal to the light source section 104 to turn on the light source 110. In some examples, the operator may manually turn the light source 110 on and off.

In at least one example, the calibration component 148, based on receiving the instruction to start the calibration sequence, may cause the camera section 106 to adjust a position of the camera 102 to a centered position. The centered position may include a position at which the light emitted from the light source section 104 is centered on the image plane of the camera 102. In such an example, the centered position may include a first position of the camera positions associated with the calibration sequence. Instructions may cause the camera cradle 124 to move into a position to which the focused collimated light is centered in an image plane of the camera 102.

The camera positions associated with the calibration sequence may include combinations of azimuth and elevation of the camera 102. In some examples, the azimuth and elevation of the camera 102 may be determined based on the centered position. In other examples, the azimuth and elevation may be determined based on a different reference point. In some examples, the camera positions may include combinations of azimuth and elevation to cover a field of view of the camera 102.

In various examples, the azimuth rotation point 138 and/or the elevation rotation point 140 may adjust the camera 102 to the camera positions. In some examples, the adjustment of the camera 102 may be directed based on one or more signals received from the calibration component 148. In such examples, the signal(s) may include which of the azimuth and/or elevation (and/or roll in embodiments comprising a roll rotation point) to adjust and/or an amount of the adjustment (e.g., distance, angle, etc.). For example, the signal(s) may include a centering signal. The centering signal may cause the camera 102 to be adjusted to a position associated with an azimuth of 0.00 and an elevation of 0.00 (or any other position in which the focused light impinges on a center of the image plane of camera 102). In various examples, the signal(s) may include an instruction to capture images of the collimated light emitted from the light source section 104 at each of the camera positions. In various examples, the instructions may include an instruction for the camera 102 to send the images to the calibration component 148. In some examples, the camera 102 may send the images in a video feed as the images are captured at each camera position.

Additionally, the signal(s) may include an instruction for the azimuth rotation point 138 and/or the elevation rotation point 140 to send an actual position of camera 102 at each of the camera positions to the calibration component 148. The actual position may include an angle between the collimated light and a center of the camera (e.g., camera lens). In some examples, the calibration component 148 may be configured to determine an undistorted rectilinear location (e.g., horizontal ($x_u$) and vertical ($y_u$)) of the collimated light at each camera position. The undistorted rectilinear location may be based, at least in part, on the angle between the camera and the collimated light at each camera position (e.g., as may be determined by assuming camera 102 is a pin-hole model camera). In various examples, the $x_u$ and $y_u$ may be determined by input provided by motors in the azimuth rotation point 138 and the elevation rotation point 140. In some examples, the motors may include stepper motors. In various examples, the motors may include those with a high positional accuracy (e.g., greater than 100,000 ticks per second). In at least one example, the motors may include an accuracy of about 125,000 ticks per second.

In various examples, in the calibration sequence, the elevation rotation point 140 of the camera section 106 may first adjust an elevation associated with the camera 102 and then the azimuth rotation point 138 may adjust an azimuth associated with the camera 102. In some examples, in the calibration sequence, the azimuth rotation point 138 may first adjust an azimuth associated with the camera 102 and then a roll rotation point may adjust a roll associated with the camera 102 to cover the field of view.

In at least one example, in the calibration sequence, the camera section 106 may first adjust an azimuth associated with the camera 102, and then an elevation associated with the camera 102. For example, the camera section 106 may adjust a position of the camera 102 to a first azimuth, such as AZ0, at a first elevation, such as EL0. The camera 102 may capture an image of the focused light at AZ0, EL0. The camera section 106 may then adjust an elevation of the camera and capture images of the focused light at camera positions AZ0, EL1; AZ0, EL2; . . . AZ0, ELN. The camera section 106 may then adjust the azimuth to a second azimuth, such as AZ1 at ELN. The camera 102 may capture an image of the focused light at AZ1, ELN, and adjust the elevation of the camera through camera positions associated with AZ1 to the point AZ1, EL0. In the calibration sequence, the camera section 106 may adjust the azimuth and elevation of the camera 102 until the camera has captured images throughout substantially the field of view of the camera 102. In at least one example, the camera 102 may capture a total of 121 images of the focused light at 121 positions. For example, the camera 102 may capture images at 11×11 azimuth and elevation combinations. Such positions (azimuth and elevation) may be determined based on ensuring homogeneous illumination of the imaging plane (e.g., such that the distribution of illuminations over the plane is substantially uniform) and may be based on, for example, a field of view of the camera.

In various examples, the calibration component 148 may receive the images captured at each camera position from the camera 102 and corresponding undistorted rectilinear locations, $x_u$ and $y_u$. Such undistorted positions may be determined based on the corresponding azimuth and elevation positions (e.g., assuming the lens to be a pin-hole and determining where in the image plane the light would hit given the orientation). In some examples, the calibration component 148 may be configured to determine a measured horizontal location of the collimated light, $x_m$, and vertical location of the collimated light, $y_m$. In some examples, the calibration component 148 may be configured to determine distorted rectilinear locations of the collimated light, $x_d$ and $y_d$ at each camera position. In such examples, the distorted rectilinear locations, $x_d$ and $y_d$, may include the distorted rectilinear locations, $x_u$ and $y_u$, corrected for one or more known parameters of the camera 102.

In various examples, the calibration component 148 may be configured to determine intrinsics of the camera 102 based at least in part on an optimization of the measured horizontal and vertical locations, $x_m$ and $y_m$, the undistorted rectilinear locations, $x_u$ and $y_u$, and/or the distorted rectilinear locations, $x_d$ and $y_d$. In some examples, the calibration component 148 may utilize one or more distortion models (e.g., polynomial model, field of view model, etc.) to determine the intrinsics of the camera 102. In various examples, the distortion model(s) may be determined based on a type of lens of the camera 102. Examples of a polynomial distortion model and a field of view distortion model, which may be used by the calibration component 148, in various examples, to determine the intrinsics of a camera 102, are provided below:

Polynomial (Poly2M4) Distortion Model $$r_u = \sqrt{x_u^2 + y_u^2} \quad (1)$$

$$r_d = 1 + k_1 \times r_u^2 + k_2 \times r_u^4 + \ldots \quad (2)$$

$$x_{d0} = f_x \times [(x_u)(r_d) + (p_1)(3x_u^2 + y_u^2) + (2p_2 x_u y_u) + (s_1)(x_u^2 + y_u^2)] \quad (3)$$

$$y_{d0} = f_y \times [(y_u)(r_d) + (p_2)(3y_u^2 + x_u^2) + (2p_1 x_u y_u) + (s_2)(x_u^2 + y_u^2)] \quad (4)$$

$$x_d = x_{d0}\cos(\theta) - y_{d0}\sin(\theta) + c_x \quad (5)$$

$$y_d = x_{d0}\sin(\theta) - y_{d0}\cos(\theta) + c_y \quad (6)$$

where:
$f_x$ represents the focal length along the horizontal axis,
$f_y$ represents the focal length along the vertical axis,
$c_x$ represents the center offset of a collimated light map in the x-axis,
$c_y$ represents the center offset of the collimated light map in the y-axis,
$k_1$ represents a first radial distortion term,
$k_2$ represents a second radial distortion term,
$p_1$ represents a first prismatic distortion term.

Field of View (FOV-M4) Distortion Model $$r_u = \sqrt{x_u^2 + y_u^2} \quad (7)$$

$$x_{d0} = x_u + (p_1)(3x_u^2 + y_u^2) + (2p_2 x_u y_u) + (s_1)(x_u^2 + y_u^2) \quad (8)$$

$$y_{d0} = y_u + (p_2)(3y_u^2 + x_u^2) + (2p_1 x_u y_u) + (s_2)(x_u^2 + y_u^2) \quad (9)$$

$$r_{u0} = \sqrt{x_{d0}^2 + y_{d0}^2} \quad (10)$$

$$r_d = 1/(w \times r_{u0})\arctan(2 r_{u0} \tan(w/2)) \quad (11)$$

$$x_d = f_x(x_{d0} r_d) + c_x \quad (12)$$

$$y_d = f_y(y_{d0} r_d) + c_y \quad (13)$$

where:
$f_x$ represents the focal length along the horizontal axis,
$f_y$ represents the focal length along the vertical axis,
$c_x$ represents the center offset of a collimated light map in the x-axis,
$c_y$ represents the center offset of the collimated light map in the y-axis,
w represents a field of view scaling term,
$p_1$ represents a first prismatic distortion term,
$p_2$ represents a second prismatic distortion term,
$s_1$ represents a first decentering distortion term, and
$s_2$ represents a second decentering distortion term.

In at least one example, a polynomial distortion model, such as Poly2M4, may be used by the calibration component 148 to determine the intrinsics of a camera 102 with a narrow angle lens and a field of view distortion model, such as FOV-M4, may be used by the calibration component 148 to determine the intrinsics of a camera 102 with an ultra-wide-angle lens (e.g., fish eye lens). Although the Poly2M4 and FOV-M4 models are described herein as particular distortion models used to calculate intrinsics of the camera 102, they are merely provided for illustrative purposes and are not meant to be limiting. Other models may additionally or alternatively be utilized by the calibration component 148 to calculate the intrinsics of a camera. Additionally, the order in which the equations are presented above (e.g., equations 1-6 and 7-13) is not intended to be limiting and the equations and/or portions thereof may be calculated in any order.

In various examples, $f_x$, $f_y$, $c_x$, $c_y$, $k_1$, $k_2$, $p_1$, $p_2$, $s_1$, $s_2$, and w may comprise intrinsics of a camera 102. In other examples, the calibration component 148 may determine a greater or fewer number of intrinsic characteristics of the camera and/or intrinsic characteristics of a different type (as a non-limiting example, additional parameters may be determined for higher order expansion terms).

In various examples, the calibration component 148 may determine the intrinsic characteristics of the camera by performing an optimization between the undistorted rectilinear locations and the measured locations of the focused light (e.g., point of light) captured in images. As discussed above, the calibration component 148 may determine camera positions (e.g., pitch/yaw angles from a reference position (e.g., centered position)) to which the azimuth rotation point 138 and/or the elevation rotation point 140 may adjust the cradle 124 for the camera 102 to capture images of the focused light. The calibration component 148 may determine the undistorted rectilinear locations (e.g., reference locations) associated with the camera positions (e.g., by determining where the light would hit on the image plane given the orientation/position). In some examples, such positions may be determined by projecting the collimated light onto an image plane at z=1 and determining the relative pixel coordinates based at least in part on a pixel density and/or size of the image plane of the camera, though any other technique is contemplated.

The calibration component 148 may apply one or more distortion parameters (e.g., radial, prismatic, decentering, etc.) to the undistorted rectilinear locations using a distortion model as described above, to determine distorted rectilinear locations (e.g., distorted reference locations). In various examples, the calibration component 148 may compare the measured locations of the focused light captured in the images at the camera positions and compare the measured locations to the distorted reference locations. In various examples, the calibration component 148 may determine a root-means-square (RMS) error based on a difference between measured locations and the distorted reference locations (e.g., Euclidean distance). In at least some examples, such distances may be weighted (either inversely or directly) according to radial distance from a center of an image. Such weighting may be based on, for example, preference to have better calibration at a center of an image, or to ensure minimal distortion at increased radial positions (e.g., in high distortion lenses, such as fish-eye lenses, distortion may be most pronounced at large radial positions).

In various examples, if the RMS error is below a threshold value, the calibration component 148 may determine that the camera has passed a calibration test and may determine the intrinsic characteristics of the camera based on the distortion parameters that resulted in the RMS error being below the threshold value. In some examples, the calibration component 148 may continually modify the distortion parameters to minimize the RMS error. In such examples, the calibration component 148 may continue modifying the distortion parameters until one or more stopping criteria are met. The stopping criteria may include an RMS error below the threshold value, a minimized RMS error, a number of iterations completed, a rate of change per iterations, or the like.

In some examples, the calibration component 148 may undistort the measured locations of the focused light according to the same distortion model to fit them to the determined reference locations. In such examples, the calibration component 148 may perform calculations similar to those described above, but in a reverse order.

Based at least in part on a determination that the camera 102 passes the intrinsics fit test, the calibration component 148 may store the calculated intrinsic characteristics associated with the camera 102 in the computing device(s) 108, such as in a datastore of the memory 146. In at least one example, the focal length ($f_x$, $f_y$) and optical center ($c_x$, $c_y$) of the camera 102 may be stored in computing device(s) 108. In various examples, the computing device 108 may be configured to send the stored intrinsics associated with the camera 102 to a remote computing device, such as a computing device associated with an autonomous vehicle on which the camera 102 is mounted. In such examples, the computing device associated with the autonomous vehicle may utilize the stored intrinsics to determine accurate positions of objects detected by the camera 102 while the autonomous vehicle is operating.

Figure 2:
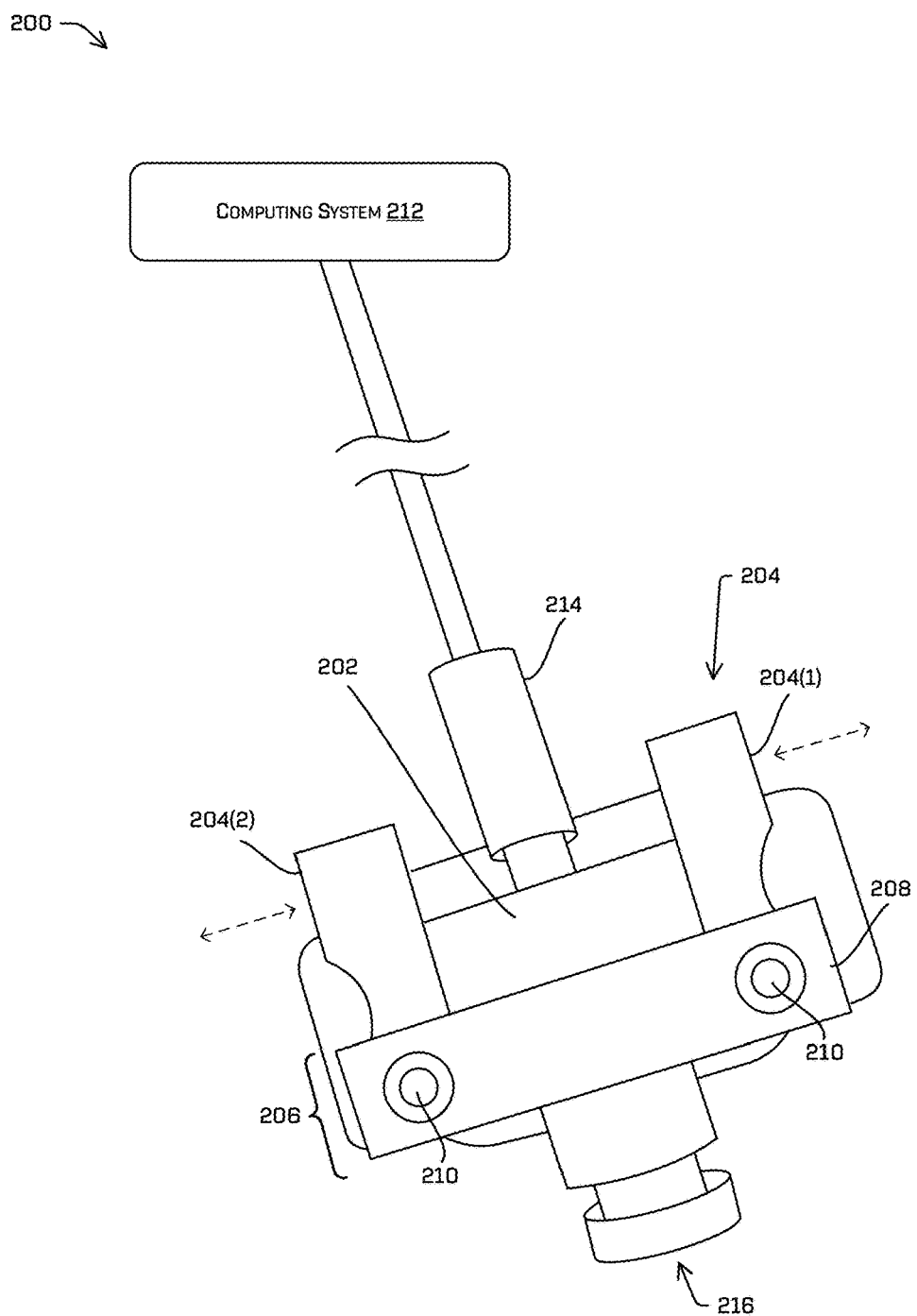
FIG. 2 is an illustration of an example cradle configured to house a camera during calibration, in accordance with embodiments of the disclosure.

FIG. 2 is an illustration of an example cradle 200, such as cradle 124, in which a camera 202, such as camera 102, may be housed during a calibration sequence. In various examples, the cradle 200 may include supports 204, such as first support 134(1) and second support 134(2), illustrated in FIG. 1. The supports 204 may be configured to brace the sides of the camera 202 and to secure the camera 202 in place throughout the calibration sequence.

In various examples, the supports 204 may be fixed to the cradle 200. In such examples, the camera 202 may be slid into place between the supports 204, such as between a first support 204(1) and a second support 204(2). In some examples, the first support 204(1) and/or the second support 204(2) may be adjustable. In such examples, the first support 204(1) and/or the second support 204(2) may be adjusted outward to seat the camera 202 into the cradle 200. Once seated, the first support 204(1) and/or the second support 204(2) may be adjusted inward to touch the sides of the camera 202, thereby bracing the camera in place in the cradle 200. Adjustable supports 204 may provide a means by which the cradle 200 may house cameras of different sizes and/or shapes.

As discussed above, in some examples, one or more of the supports 204 may be fixed in place. In such examples, the fixed support(s) 204 may be fixably coupled to the cradle 200, such as by a weld, mold, glue, or other attachment mechanism. In various examples, one or more of the supports 204 may be adjustable. In such examples, the adjustable support(s) 204 may be secured in place by a fastening mechanism 206, such as fastening mechanism 136. In some examples, the fastening mechanism 206 may include a mechanical mechanism configured to tighten an adjustable support 204 in place. In such examples, the fastening mechanism 206 may include a screw-type fastener, a spring-type fastener, a clamp, a quick-release fastener, a snap-in fastener, an elastic fastener, or any other mechanism configured to secure the support 204 in place. In the illustrative example, the fastening mechanism 206 includes a plate 208 and two fasteners 210 (e.g., screws, bolts, rivets, etc.). In other examples, the fastening mechanism 206 may include a larger or smaller plate 208 and/or a greater or lesser number of fasteners 210. In some examples, plates 208 and/or fasteners 210 of different sizes may be used to secure cameras 202 of different sizes in the cradle 200. In some examples, the fastening mechanism 206 may be configured to couple an adjustable support 204 to a fixed support 204.

As discussed above, the camera 202 may be communicatively coupled to a computing system 212, such as computing device(s) 108, via a connector 214. In the illustrative example, the connector 214 includes a wired connector. In other examples, the connector 214 may include a wireless connector. In various examples, the computing system 212 may be configured to manage a calibration sequence of the camera 202 housed in the cradle 200. In some examples, the computing system may transmit signals (e.g., calibration signal, capture signal, etc.) to the camera to capture images via a camera lens 216. In various examples, the computing system 212 may generate the signals based at least in part on the camera lens 216. In such examples, the instructions may be based on a type, a size, a field of view, or any other parameters associated with the lens 216.

Figure 3:
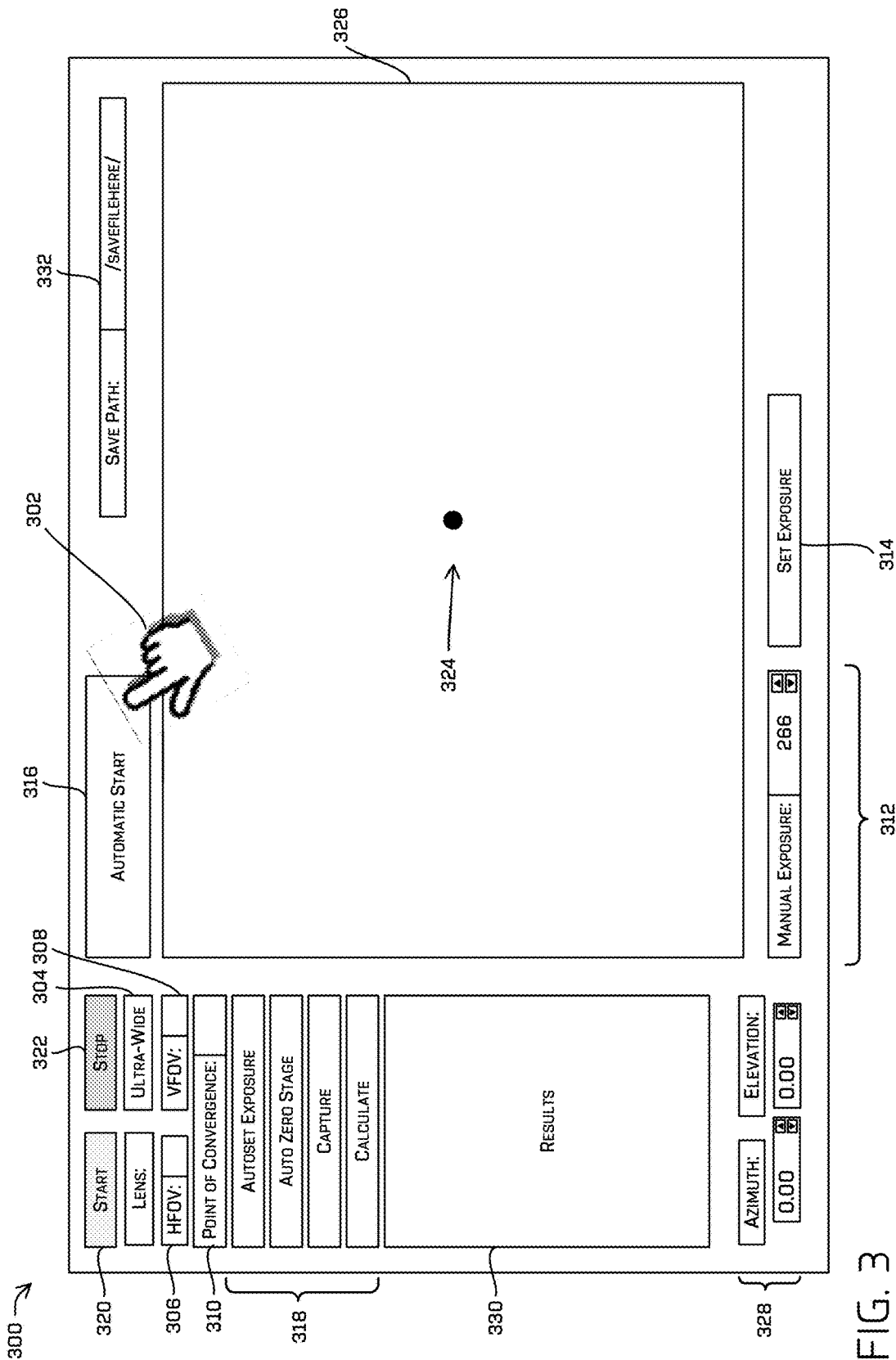
FIG. 3 is an illustration of an example graphical user interface for use in the camera calibration system described herein.

FIG. 3 is an illustration of an example user interface 300 for use in a camera calibration system, such as calibration system 100. In various examples, the user interface 300 may be associated with a calibration component of a computing device, such as calibration component 148 of computing device(s) 108. The user interface 300 may provide a means by which an operator 302 may cause the calibration component to calibrate a camera, such as camera 102.

In various examples, the user interface 300 may include a lens entry 304. The lens entry may provide a means by which the operator may input a type of lens associated with the camera. In the illustrative example, the operator 302 inputs an ultra-wide-angle lens (e.g., fish eye lens). In some examples, the lens entry 304 may be configured with a drop-down menu of lens types, a manual entry box for entering the lens type, or the like. In various examples, the user interface 300 may include a horizontal field of view (HFOV) entry 306 and a vertical field of view (VFOV) entry 308. The HFOV entry 306 and VFOV entry 308 may provide a means by which the operator 302 may enter in a horizontal and/or a vertical field of view associated with the camera. In such examples, the HFOV and VFOV may be used as a basis for determining the angles (e.g., azimuth and/or elevation) used for calibration. In various examples, the user interface 300 may include a point of convergence entry 310. In other examples, one or more other known parameters of the camera may be input via one or more other entries.

In the illustrative, the user interface may include a manual exposure entry 312. The manual exposure entry may provide a means by which the operator may enter an exposure of the camera. The operator 302 may manually set the entered exposure by selecting the set exposure option 314.

In various examples, the user interface 300 may include an automatic start 316. Responsive to a selection of the automatic start 316 by the operator 302, the calibration component may run a calibration sequence. In some examples, the calibration sequence may include setting an exposure (e.g., manual or automatic), centering the camera at the point of convergence (e.g., collimated light at center of lens), capturing images of the collimated light at determined camera positions, and/or calculating camera intrinsics. In other examples, the calibration sequence may include a greater or fewer number of steps prior to calculating the camera intrinsics.

In various examples, the operator 302 may manually perform each step in the calibration sequence, such as by selecting stage options 318. In the illustrative example, the stage options 318 include "autoset exposure," "auto zero stage," "capture," and "calculate." In other examples, the stage options 318 may include a greater or lesser number of stages for selection. In various examples, the operator 302 may start each stage by selecting individual stage options 318. In some examples, the operator 302 may select a stage via the individual stage options 318 and may start the individual stage options 318 by selecting the start button 320. In various examples, the operator 302 may stop the calibration sequence by selecting the stop button 322. In various examples, the operator may start and stop the calibration sequence using the start button 320 and the stop button 322.

In the illustrative example, the operator 302 selects the automatic start 316. Responsive to the selection of the automatic start 316, the camera may adjust to a centered position (e.g., zero stage, collimated light at the center of convergence of the camera). The camera may capture an image of the collimated light at the centered position, such as illustrated by focused point of light 324 in viewing pane 326. In various examples, the user interface 300 may include an azimuth and elevation display 328 representative of the azimuth and elevation of the camera at a current position in the calibration sequence. In the illustrative example, the centered position may be associated with a relative azimuth of 0.00 and an elevation of 0.00, as shown on the azimuth and elevation display 328. In other examples, the centered position may be associated with a different azimuth and elevation.

As discussed above, after centering the camera at the point of convergence (e.g., setting the zero stage), the camera may adjust an azimuth and/or elevation to predetermined positions throughout the field of view of the lens. The camera may capture an image of the focused collimated light at each of the predetermined positions (e.g., capture stage). As will be illustrated in greater detail below with respect to FIGS. 4A-C and 5A-C, the images of the focused light captured at the predetermined positions may be displayed in the viewing pane 326. In various examples, the viewing pane 326 may display locations of the focused point of light 324 as it is captured at each of the predetermined positions in the calibration sequence. In some examples, the viewing pane 326 may display the locations in real-time, such as via a live video feed from the camera to the computing system.

In various examples, at the calculate stage, the calibration component may determine a measured horizontal location $x_m$ and vertical location $y_m$ of the focused collimated light at each position (which, in some examples, may be a centroid of illuminated points). In some examples, the calibration component may also determine undistorted locations $x_u$, $y_u$ (based on the orientations of the camera) and distorted locations $x_d$, $y_d$ (as may be computed based on an assumed intrinsics) associated with each predetermined positions. As discussed above, the calibration component may calculate the intrinsics of the camera and/or the RMS error, and/or maximum error based at least in part on the measured and distorted locations associated with the calibration sequence. In various examples, the user interface 300 may publish the intrinsics and/or errors in the results pane 330.

In some examples, the calibration component may automatically save the intrinsics and/or error(s) to a datastore of the computing system. In various examples, the user interface 300 may include a save path 332. In such examples, the operator 302 may manually save the intrinsics and/or error(s). The save path 332 may provide a means by which the operator 302 may enter a particular path and/or designated name for saving the intrinsics and/or the error(s). Additionally or in the alternative, the computing device and/or the calibration component may send the intrinsics and/or error(s) to a remote computing device, such as a computing device associated with an autonomous vehicle on which the camera is/is to be mounted. In such examples, the computing device associated with the autonomous vehicle may utilize the intrinsics and/or error(s) to determine accurate positions of objects detected by the camera while the autonomous vehicle is operating.

Figure 4A:
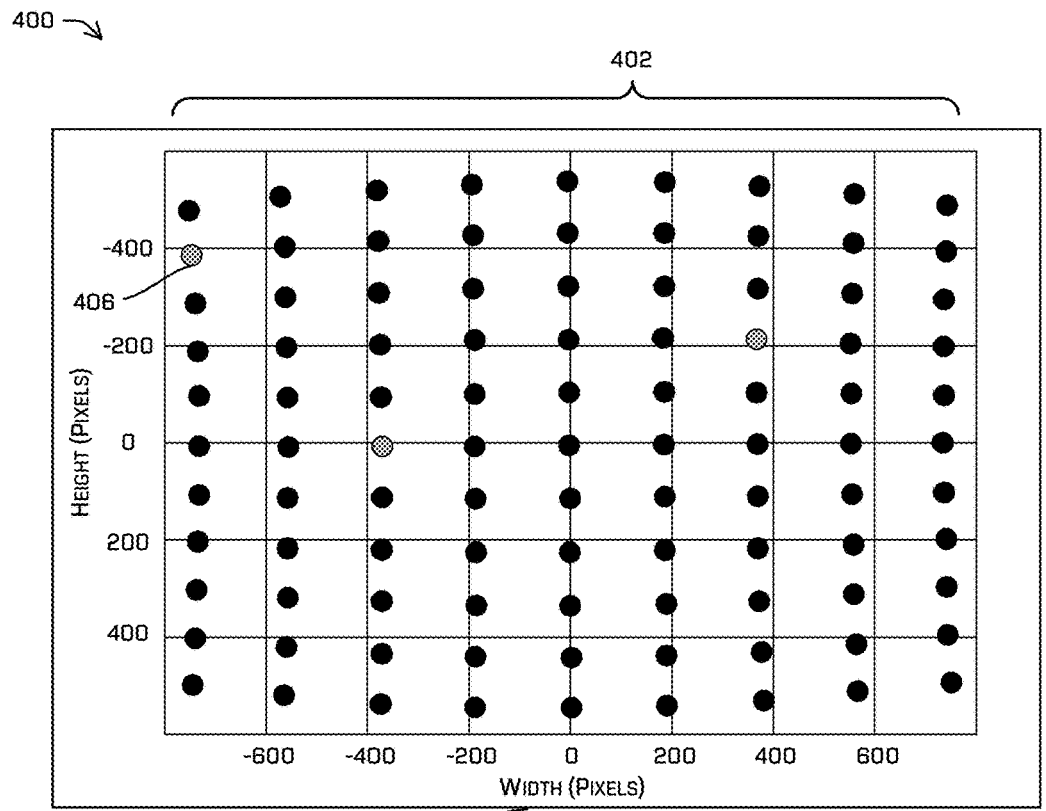
FIGS. 4A, 4B, and 4C are illustrations of example results from the camera calibration system in which the camera passes the calibration test.
Figure 4B:
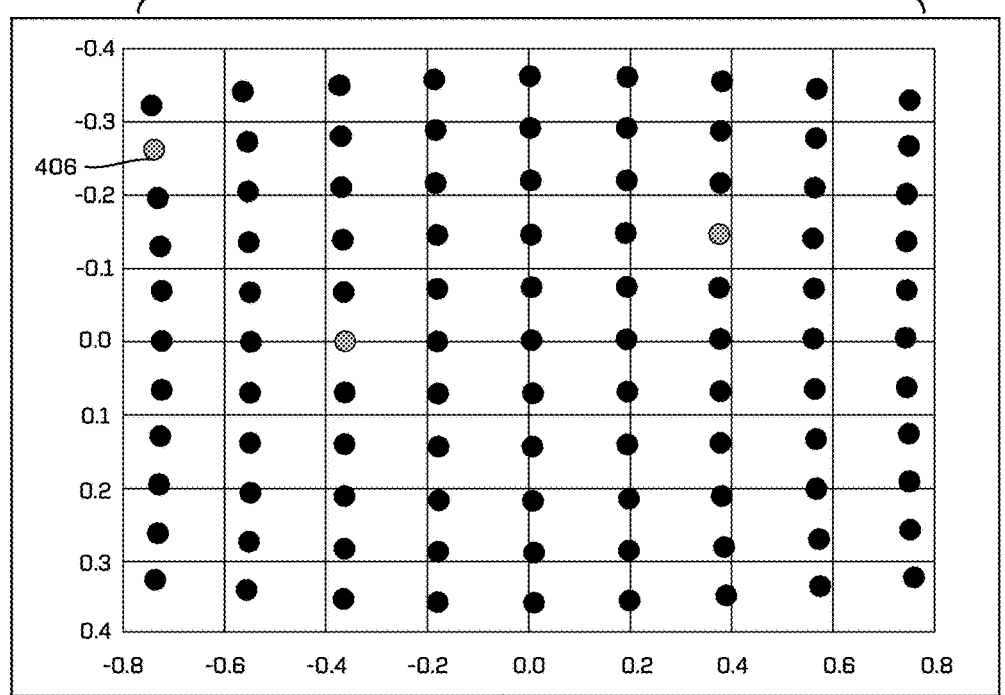
Figure 4C:
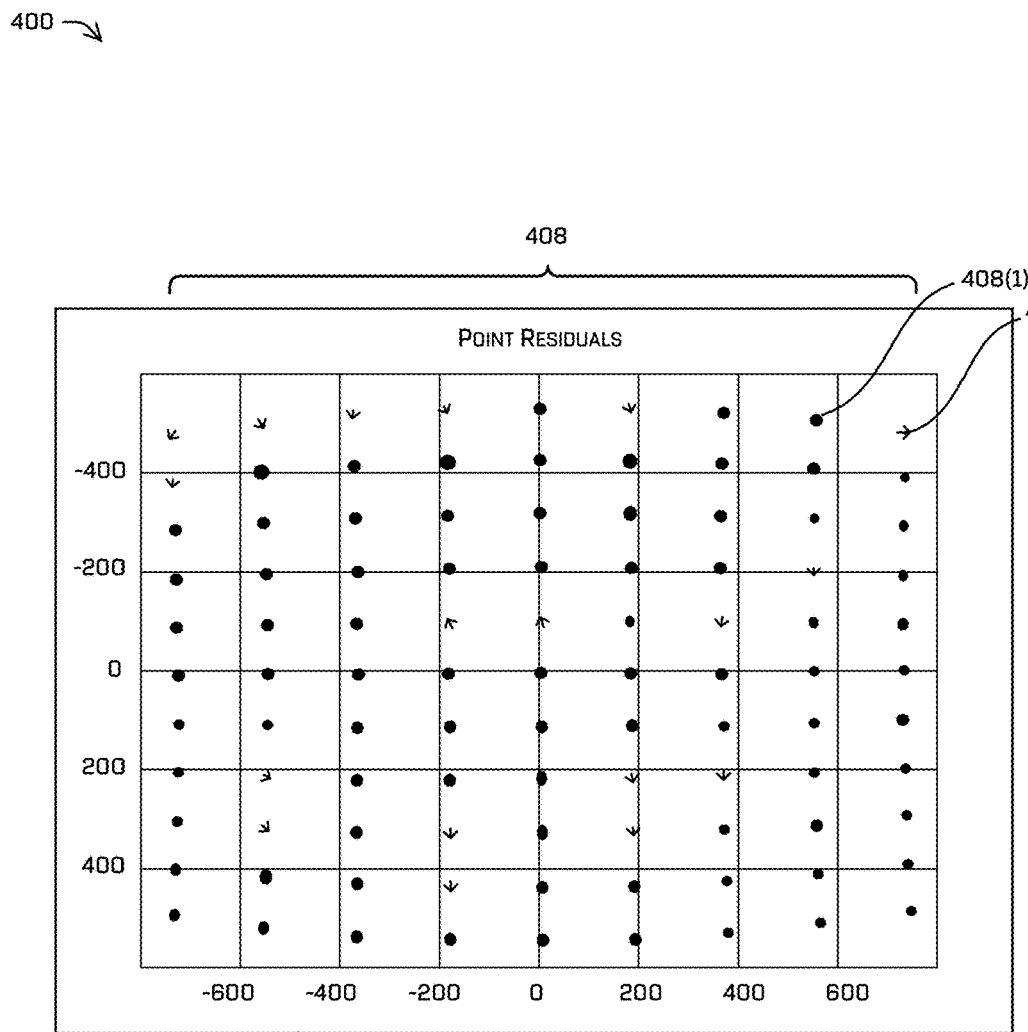

FIGS. 4A, 4B, and 4C are illustrations of example results 400 from the camera calibration system in which a camera passes a calibration test. FIG. 4A illustrates measured points of light 402 (e.g., focused collimated light) displayed on a viewing pane 404, such as viewing pane 326, at various positions of the camera. FIGS. 4A-4C illustrate all such images in a single image. In some examples, the camera may send images of the points of light 402 at each position. In such examples, a calibration component may determine the location of the points of light 402 with respect to a center point (e.g., point of convergence) of the camera. In at least one example, the location of the points of light 402 may be determined based on its center coordinate (e.g., center of mass method). In some examples, the camera may determine the location of the point of light 402 with respect to the point of convergence (e.g., image center). In such examples, the camera may send the location to the calibration component.

In various examples, each point of light 402 location may be displayed in substantially real-time as it is captured by the camera throughout the calibration sequence. In such examples, the camera may send a video feed to a computing system associated with the camera calibration system. In some examples, the locations of the point of light 402 and/or images may be uploaded at predetermined times throughout the calibration sequence. In some examples, the camera may store images and/or positions of the point of light 402 captured throughout the calibration sequence. In such examples, the camera may send the images and/or positions at predetermined times and/or based upon receiving an instruction from the calibration component to send the images and/or positions.

In the illustrative example, the measured position of the point of light 402 is displayed relative to a height at width of pixels. In various examples, the range of heights and width of pixels may be based on a type of the camera lens, a field of view of the camera lens, a resolution (e.g., horizontal, vertical and/or total pixel count) of the camera, and/or other known parameters of the camera. In at least one example, the range may be based on a field of view of the camera lens.

FIG. 4B illustrates undistorted reference locations of the point of light 402 at the camera positions (e.g., azimuth and elevation angles). The reference locations may include expected locations of the collimated light corresponding to a particular position of the camera. In various examples, the calibration component may be configured to determine a horizontal and vertical reference location of each point of light 402 based on the azimuth and elevation angles. The calibration component may use the horizontal and vertical reference locations to determine distorted reference locations to determine intrinsic characteristics of the camera through optimization, such as described above with regard to at least FIG. 1.

In various examples, the camera and/or calibration component may identify one or more reference points 406. In the illustrative example, the reference point(s) 406 are represented in a different color than another point of light 402. In some examples, the reference point(s) 406 may be represented in a different shape, color, and/or other distinguishing feature to provide a means by which the reference point(s) 406 are distinguishable from another point of light 402. In some examples, the reference point(s) 406 may provide a visual confirmation that the point of light 402 associated with a particular height and width (as illustrated in FIG. 4A) corresponds to the respective angle (as illustrated in FIG. 4B). This may be particularly useful in determining whether the camera is oriented correctly.

FIG. 4C illustrates point residuals 408 displayed on viewing pane 404 resulting from the comparison. The point residuals 408 may be determined based on a comparison of the measured locations of the points of light 402 illustrated in FIG. 4A and the distorted reference locations of the points of light 402 illustrated in FIG. 4B. The point residuals 408 illustrated in FIG. 4C may include those associated with the passing results (e.g., camera passes the calibration test).

In various examples, the point residual 408 may represent an amount of difference between the measured location and the distorted reference location of the point of light. The point residuals 408 may be represented based on an amount of error is detected between the measured location and the reference location. In various examples, the calibration component may sum the errors associated with each point of light 402 (e.g., residual error) and run an optimization over the residual error. As described above, the optimization may result in a minimization of an RMS error associated with the camera. In various examples, the calibration component may determine that an optimization is complete based on a determination that the RMS error is minimized, the RMS error is below a threshold error, a rate of change associated with the RMS error is below a threshold for each iteration of optimization (e.g., parameter adjustment), a number of iterations has been completed, or the like.

In some examples, the measured location and the reference location may have substantially no error (e.g., height/width measurement and/or angular measurement substantially the same). For example, a point residual 408(1) may be represented as having little error between the measured location and the reference location. In various examples, the measured location and the reference location may include an error (e.g., difference in corresponding height/width measurement, difference in Euclidean distance, etc.).

In some examples, such as for visualization purposes, the error may be represented as a vector. In such examples, the vector may represent an amount of error and a direction of the error. The direction of error may include a direction from the reference location to the measured location, or vice versa. For example, point residual 408(2) illustrates a vector in which the reference location and the measured location differ from left to right. In various examples, a point residual 408 representation as a vector may be based on the difference exceeding a threshold difference (e.g., 0.1 degrees, 0.2 degrees, 25 pixels, 50 pixels, etc.). In some examples, a point residual 408 representation as a deformed focused light may be based on a determination that the difference exceeds a first threshold, and a representation as a vector may be based on a determination that the difference exceeds a second threshold. In various examples, the difference may be multiplied by a factor (e.g., 10 times, 20 times, 100 times, etc.) for viewing in the viewing pane 404. In such examples, the viewing pane may display an exaggerated representation of differences between the measured locations and the reference locations.

In various examples, based on the difference between the measured locations and the reference locations, the calibration component may calculate the intrinsic characteristics of the camera and maximum and/or RMS errors associated therewith. In some examples, the intrinsic characteristics and/or error(s) may be displayed in a results pane 410, such as results pane 330. In various examples, the results pane 410 may additionally include a distortion model used to calculate the intrinsics and/or error(s). In the illustrative example, a Poly2M4 polynomial distortion model was used. In other examples, such as that illustrated in FIG. 5C, other distortion models may be used.

In some examples, the calibration component may present, on the results pane 410, whether the camera passed or failed the calibration test. A pass or a fail of the calibration test may be determined based on a maximum error and/or an RMS error associated with the differences between the measured locations and the reference locations. In some examples, to pass a test, the maximum error and/or the RMS error must be less than a threshold error. In some examples, the threshold error may be based on the type of lens, the field of view of the lens, a resolution (e.g., horizontal, vertical and/or total pixel count) of the camera, and/or other known parameters of the camera. In some examples, the threshold error may be based on the distortion model used. In the illustrative example, the camera passes the calibration test.

Figure 5A:
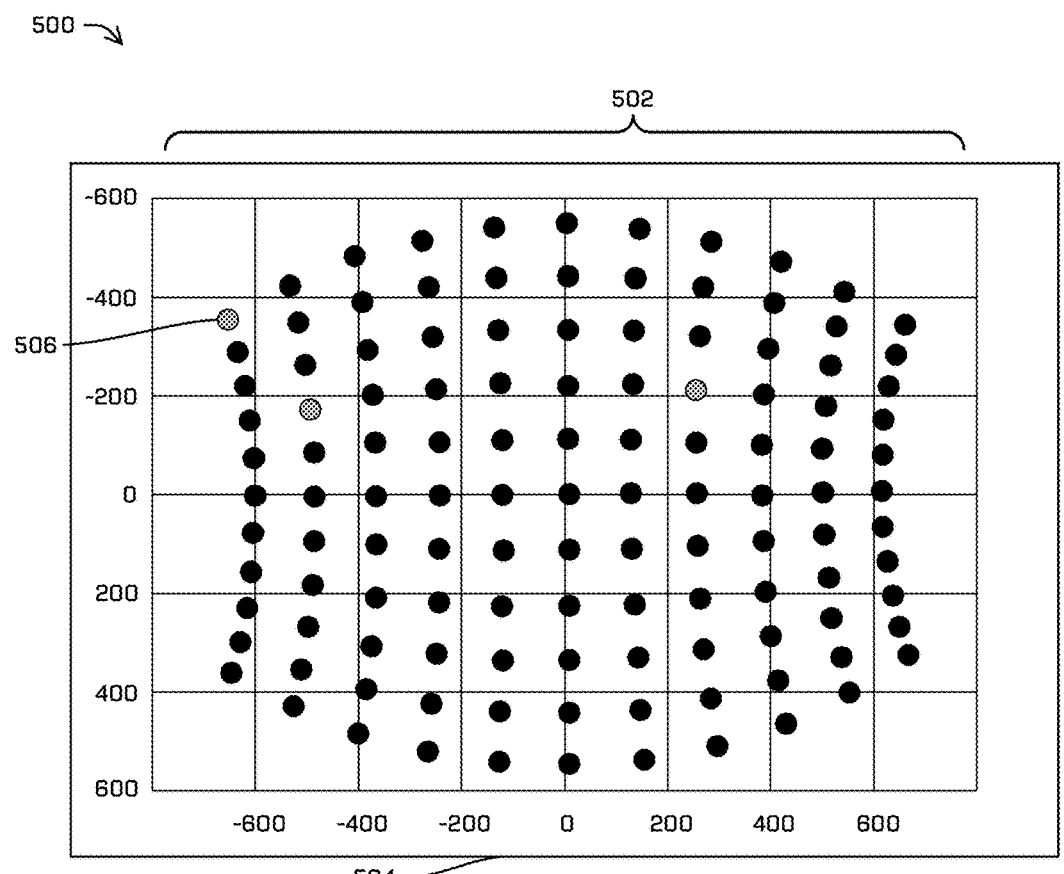
FIGS. 5A, 5B, and 5C are illustrations of example results from the camera calibration system in which the camera fails the calibration test.
Figure 5B:
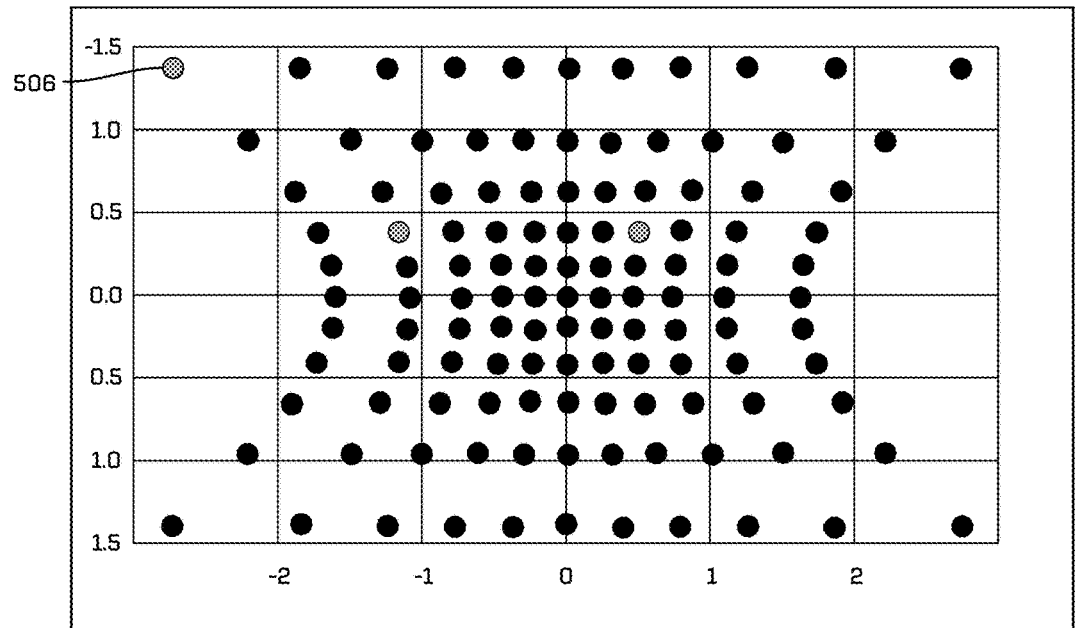
Figure 5C:
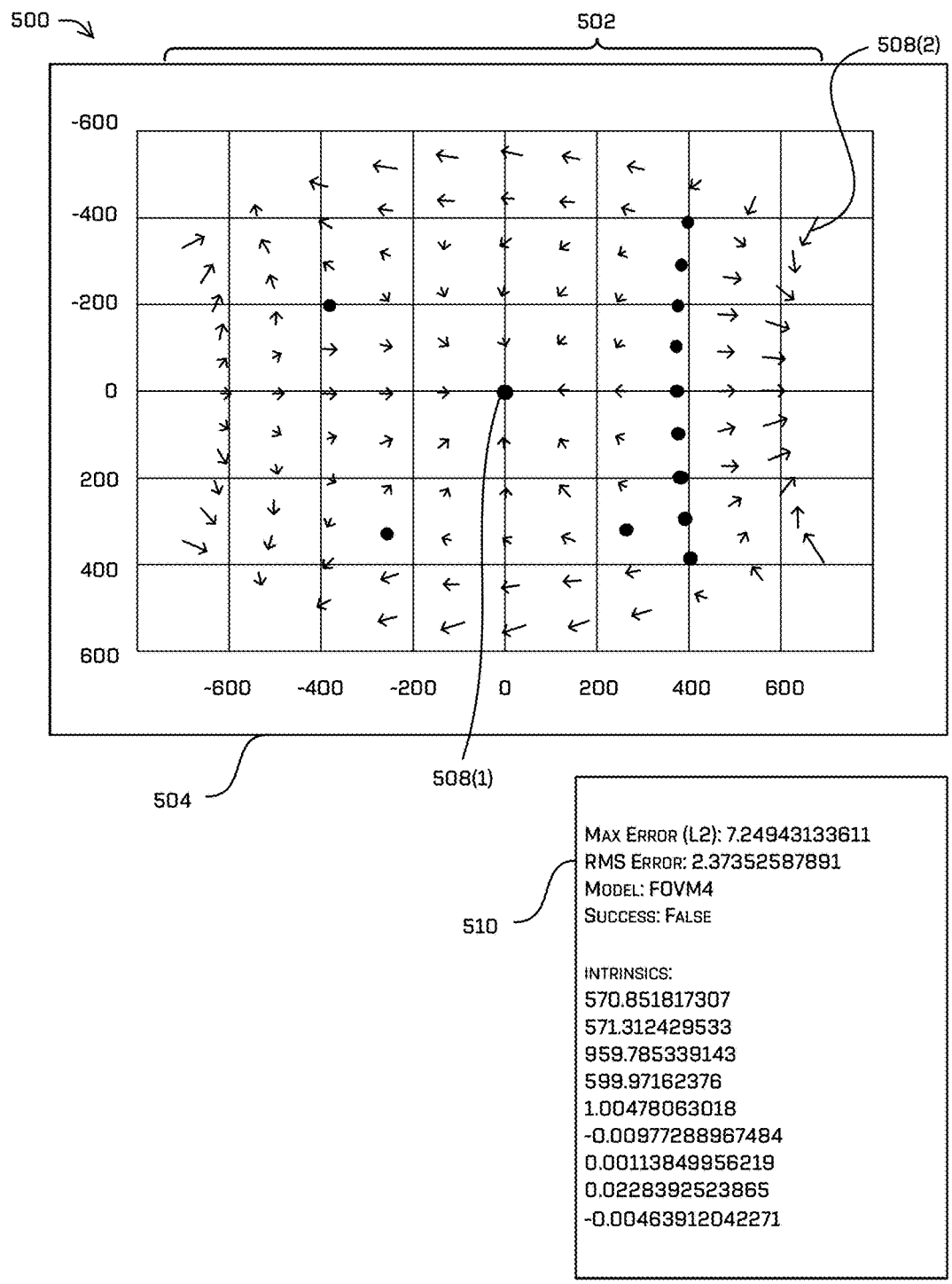

FIGS. 5A, 5B, and 5C are illustrations of example results 500 from the camera calibration system in which the camera fails the calibration test. FIG. 5A illustrates measured points of light 502 displayed on a viewing pane 504, such as viewing pane 326, at various positions of the camera. FIGS. 5A-5C illustrate all such images in a single image. In some examples, the camera may send images of the point of light 502 at each position. In such examples, a calibration component may determine the location of the point of light 502 with respect to a center point (e.g., point of convergence) of the camera. In at least one example, the location of the point of light 502 may be determined based on its center coordinate (e.g., centroid, center of mass method). In some examples, the camera may determine the location of the star with respect to the point of convergence. In such examples, the camera may send the location of the point of light 502 to the calibration component.

In various examples, each point of light 502 location may be displayed in substantially real-time as it is captured by the camera throughout the calibration sequence. In such examples, the camera may send a video feed to a computing system associated with the camera calibration system. In some examples, the locations of the point of light 502 and/or images may be uploaded at predetermined times throughout the calibration sequence. In some examples, the camera may store images and/or positions of the point of light 502 captured throughout the calibration sequence. In such examples, the camera may send the images and/or positions at predetermined times and/or based upon receiving an instruction from the calibration component to send the images and/or positions.

In the illustrative example, the measured position of the point of light 502 is displayed relative to a height at width of pixels. In various examples, the range of heights and widths displayed may be based on type of the camera lens, a field of view of the camera lens, a resolution (e.g., horizontal, vertical and/or total pixel count) of the camera, and/or other known parameters of the camera. In at least one example, the range may be based on a field of view of the camera lens.

FIG. 5B illustrates distorted reference locations of the point of light 502 at the camera positions (e.g., azimuth and elevation angles). The reference locations may include expected locations of the collimated light corresponding to a particular position of the camera. In various examples, the calibration component may be configured to determine a horizontal and vertical reference location of each point of light 502 based on the azimuth and elevation angles and apply a distortion model to such reference locations to determine the expected locations. The calibration component may use the horizontal and vertical reference locations to determine intrinsic characteristics of the camera through optimization, such as described above with regard to at least FIG. 1, based on differences between the measured and expected locations. In various examples, the range of angles displayed may be based on a camera lens. In some examples, the range may be based on a field of view of the camera lens.

In various examples, the camera and/or calibration component may identify one or more reference points 506 (e.g., points of light configured as a reference point). In the illustrative example, the reference points(s) 506 are represented in a different color than the other points of light 502. In some examples, the reference point(s) 506 may be represented in a different shape and/or other distinguishing feature to provide a means by which the reference point(s) 506 are distinguishable from another point of light 502. In some examples, the reference point(s) 506 may provide a visual confirmation that the point of light 502 associated with a particular height and width (as illustrated in FIG. 5A) corresponds to the respective angle (as illustrated in FIG. 5B).

In various examples, the calibration component may process the measured locations of the point of light 502 and may compare the measured locations to the reference points (e.g., as may be determined based on applying a distortion to the pin-hole model point associated with the particular orientation). FIG. 5C illustrates point residuals 508 displayed on viewing pane 504 resulting from the comparison. The point residuals illustrated in FIG. 5C may include those associated with the failing results (e.g., camera fails the calibration test).

As discussed above, in at least one example, the calibration component may compare the locations associated with a point of light, such as point of light 502 (e.g., angle of $x_m$, $y_m$), at a particular location to the angles of a reference location (e.g., $x_u$, $y_u$ and/or $x_d$, $y_d$) at the particular location. Based on the comparison, the calibration component may determine a point residual 508 associated with the point of light 502 at each location. Such a residual may be, for example, a Euclidean distance between the distorted point associated with the measured point in image space. In some examples, the distance may be weighted (directly or inversely proportional to) based on a radial distance from a center of the camera.

In various examples, the point residual 508 may represent an amount of difference between the measured location and the reference location of the point of light 502. The reference location may include an expected location of the collimated light corresponding to a particular position of the camera. The point residuals 508 may be represented based on an amount of error is detected between the measured location and the reference location. In some examples, the measured location and the reference location may have substantially no error (e.g., height/width measurement and/or angular measurement substantially the same). For example, a point residual 508(1) may be represented as having little error between the measured location and the reference location. In various examples, the measured location and the reference location may include an error (e.g., difference in corresponding height/width measurement and/or angular measurement). In various examples, the calibration component may perform an optimization over the point residuals 508 substantially simultaneously to calculate an RMS error and/or intrinsic characteristics associated with the camera.

As an illustrative example, the error may be represented as a vector. In such examples, the vector may represent an amount of error and a direction of the error. The direction of error may include a direction from the reference location to the measured location, or vice versa. For example, point residual 508(2) illustrates a vector in which the reference location and the measured location differ from left to right. In various examples, the difference may be multiplied by a factor (e.g., 10 times, 20 times, 100 times, etc.) for viewing in the viewing pane 504. In such examples, the viewing pane 504 may display an exaggerated representation of differences between the measured locations and the reference locations. In various examples, a point residual 508 with a difference that exceeds a threshold difference may be represented in a particular color. For example, a first point residual, such as point residual 508(1), with a difference below a threshold may be represented in green and a second point residual 508, such as point residual 508(2) with a difference above the threshold may be represented in red.

In various examples, based on the difference between the measured locations and the reference locations, the calibration component may calculate the intrinsic characteristic of the camera and maximum and/or RMS errors associated therewith. As described above, the calibration component may use gradient descent, non-linear least squares, or the like, to perform optimization of the sum of the point residuals 508. In some examples, based on the optimization, the calibration component may determine the intrinsic characteristics and/or errors. In some examples, the intrinsic characteristics and/or error(s) may be displayed in a results pane 510, such as results pane 330. In various examples, the results pane 510 may additionally include a distortion model used to calculate the intrinsic characteristics and/or error(s). In the illustrative example, an FOV-M4 polynomial distortion model was used. In other examples, other distortion models may be used.

In some examples, the calibration component may present, on the results pane 510, whether the camera passed or failed the calibration test. A pass or a fail (e.g., true, false) of the calibration test may be determined based on a maximum error and/or an RMS error associated with the differences between the measured locations and the reference locations. In various examples, the pass or fail of the calibration test may be displayed based on a determination that one or more stopping criteria are met. As discussed above, the stopping criteria may include determining that an error between the reference locations and the measured locations is minimized (e.g., below a threshold), computing a predetermined number or iterations, determining that a rate of change between iterations is below a threshold, or the like. In some examples, to pass a test, the maximum error and/or the RMS error must be less than a threshold error. In some examples, the threshold error may be based on the type of lens, the field of view of the lens, a resolution (e.g., horizontal, vertical and/or total pixel count) of the camera, and/or other known parameters of the camera. In some examples, the threshold error may be based on the distortion model used. In the illustrative example, the camera fails the calibration test.

Figure 6:
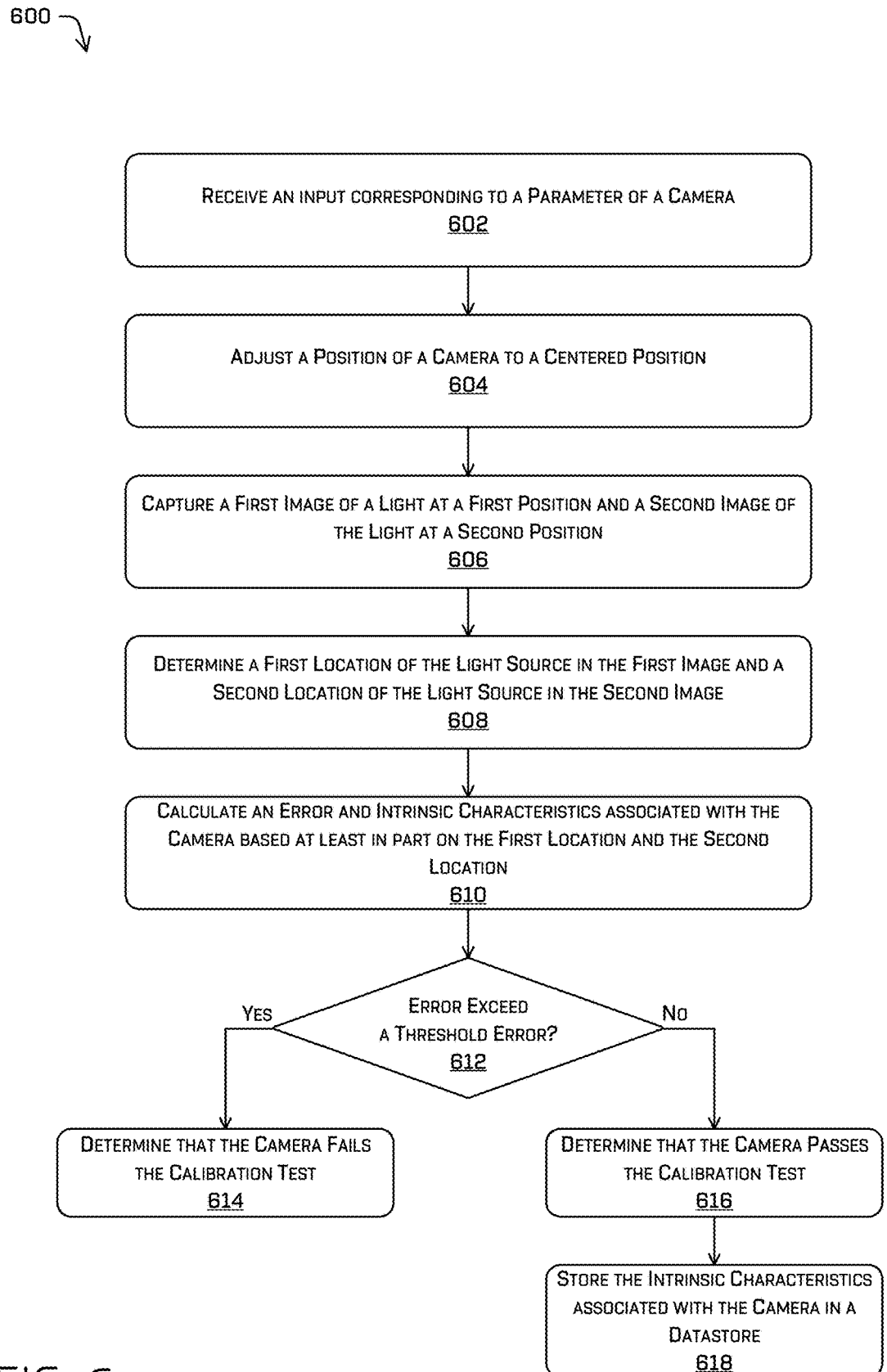
FIG. 6 depicts an example process for calibrating a camera using a camera calibration system, in accordance with embodiments of the disclosure.
Figure 7:
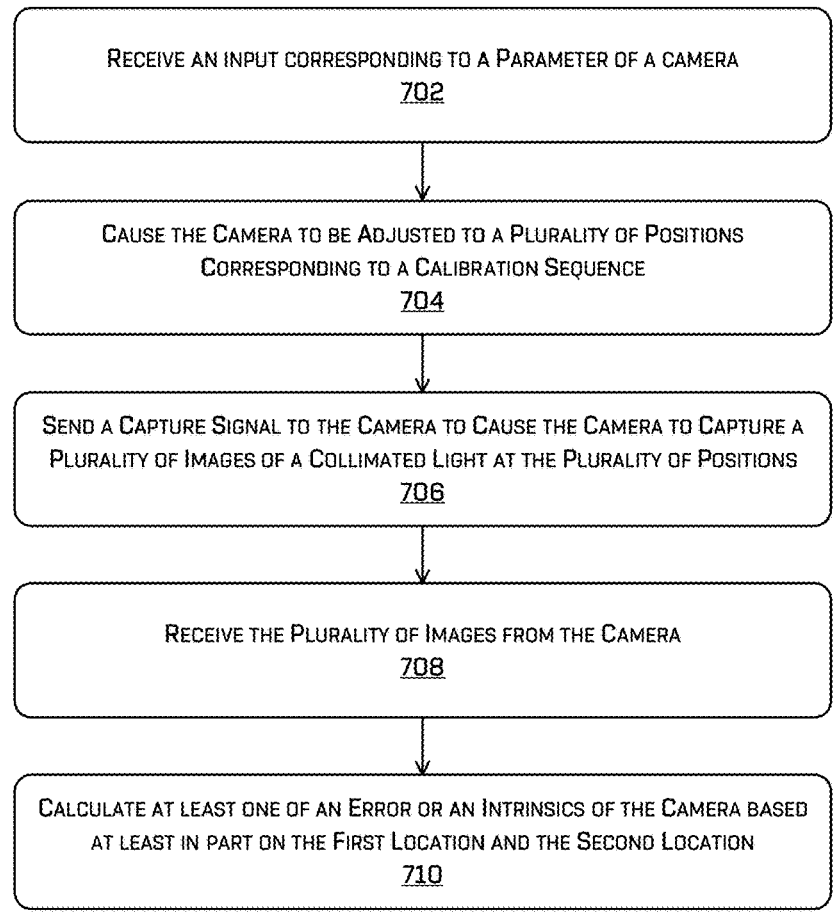
FIG. 7 depicts another example process for calibrating a camera, in accordance with embodiments of the disclosure.
Figure 8:
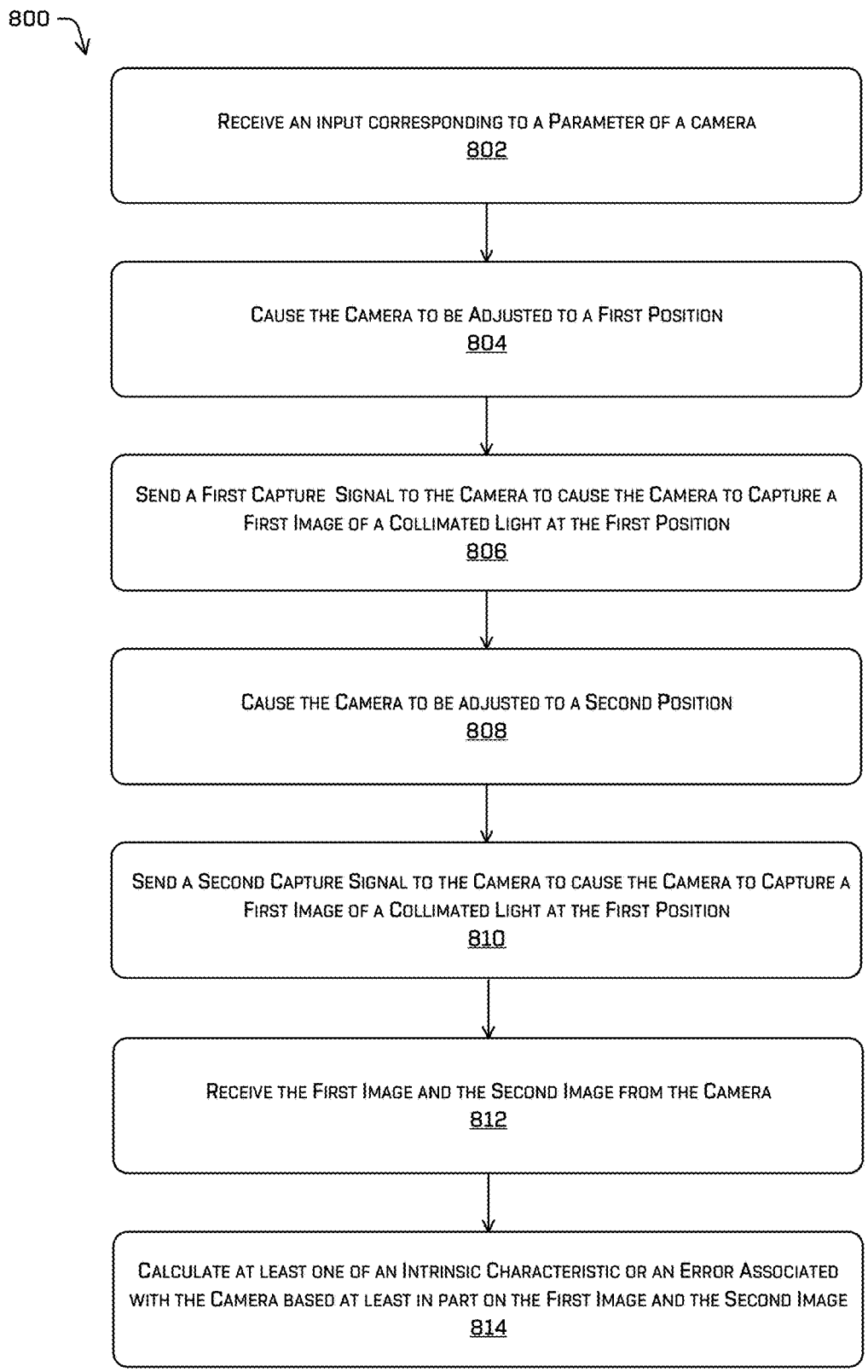
FIG. 8 depicts yet another example process for calibrating a camera, in accordance with embodiments of the disclosure.

FIGS. 6, 7, and 8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 6 depicts an example process 600 for calibrating a camera using a camera calibration system, in accordance with embodiments of the disclosure. As discussed above, the camera calibration system may include one or more computing devices, a light source section configured to emit a light, and a camera section configured to house the camera.

At operation 602, the process may include receiving an input corresponding to a parameter of the camera. The input may be received by the computing device(s) associated with the camera calibration system. The parameter of the camera may include an exposure (i.e., aperture, shutter speed, ISO speed) of the camera, a type of lens associated with the camera, a field of view of the lens (e.g., horizontal field of view, vertical field of view, etc.), a resolution associated with the camera, or any other known parameters of the camera. In at least one example, the parameter includes the exposure of the camera.

At operation 604, the process may include adjusting a position of the camera to a centered position. In some examples, the computing device(s) may send a signal to the camera section to cause the camera section to move the camera to the centered position. In some examples, the signal may include an azimuth and elevation associated with the centered position. In various examples, the centered position may include a position at which a center of a light source is centered on a lens of the camera. In such examples, the centered position may be based on a point of convergence of the camera.

At operation 606, the process may include capturing a first image of the light at a first position and a second image of the light at a second position. The light may include the collimated light emitted from the light source section of the calibration station.

At operation 608, the process may include determining a first location of the light in the first image and a second location of the light source in the second image. The first location and the second location may be based on a center point of the collimated light captured in the image. In some examples, the first location and the second location may be based on a height and width of the center point in pixels. In some examples, the height and width of the center point may be determined based on a location associated with the centered position.

At operation 610, the process may include calculating an error associated with the camera and one or more intrinsic characteristics of the camera based at least in part on the first location and the second location. In various examples, the error and/or the intrinsic characteristic may be based on reference locations associated with the first position and the second position, respectively. In such examples, the computing device(s) may determine the reference locations based on an expected position of the point of light at a certain camera position.

In various examples, the computing device(s) may apply a distortion model using distortion parameters to the reference locations to determine distorted reference locations. The distorted reference locations may be compared to the measured locations of the point of light at respective camera positions to determine an error associated with each point and a total error associated with the camera based on the distortion parameters. The errors may be based, at least in part, on a distance (e.g., Euclidean distance) between the measured locations and the distorted reference locations (which may, in some examples, also comprise a weighting based on a radial distance). In various examples, during optimization, the computing device(s) may adjust the distortion parameters to minimize the errors between the measured locations and the reference locations. In various examples, the computing device(s) may calculate the intrinsic characteristics based on an optimized value of the distortion parameters (e.g., value of distortion parameters resulting in a minimized error between the measured locations and the reference locations). The intrinsic characteristics may include a focal length of the lens and an optical center of the lens.

At operation 612, the process may include determining whether the error exceeds a threshold error. The threshold error may be determined based on the camera, the lens, the distortion model used to calculate the error and the intrinsic characteristics of the camera, or other factors and/or parameters associated with the camera.

Based at least on determining that the error exceeds the threshold ("yes" at operation 612), the process may include, at operation 614, determining that the camera fails the calibration test. In some examples, responsive to a determination that the camera fails the calibration test, the intrinsic characteristics may not be stored by the computing device(s).

Based at least on determining that the error exceeds the threshold ("no" at operation 612), the process may include, at operation 616, determining that the camera passes the calibration test.

At operation 618, based on a determination that the camera passes the calibration test, the process may include storing the intrinsic characteristics associated with the camera in a datastore. In some examples, the camera may be subsequently deployed for use by an autonomous vehicle to assist in the operation and/or control thereof. In such examples, the computing device(s) may send the intrinsic characteristics associated with the camera to a computing device associated with the autonomous vehicle.

FIG. 7 depicts an example process 700 for calibrating a camera. The camera may be calibrated using a calibration station, as described herein.

At operation 702, the process may include receiving an input corresponding to a parameter associated with the camera. The input may be received by the computing device(s) associated with the camera calibration system. The parameter of the camera may include an exposure (i.e., aperture, shutter speed, ISO speed) of the camera, a type of lens associated with the camera, a field of view of the lens (e.g., horizontal field of view, vertical field of view, etc.), a resolution associated with the camera, or any other known parameters of the camera. In at least one example, the parameter includes the exposure of the camera.

At operation 704, the process may include causing the camera to be adjusted to a plurality of positions corresponding to a calibration sequence. In some examples, the plurality of positions may be determined based on a field of view of a camera lens, a type of camera lens, or other factors associated with the camera. The plurality of positions may correspond to azimuths and elevations measured from a reference point. In some examples, the reference point may include a centered position. The centered position may include a position at which a collimated light is centered on a lens of the camera (e.g., a point of convergence).

In various examples, the computing device(s) may determine reference locations (e.g., undistorted rectilinear locations) of the point of light at each of the plurality of positions. In such examples, the reference locations may include positions at which the point of light is expected to be detected on an image plane of the camera at each of the positions.

At operation 706, the process may include sending a capture signal to the camera to cause the camera to capture a plurality of images of a collimated light at the plurality of positions. Each image of the plurality of image may be captured at a position of the respective positions.

At operation 708, the process may include receiving the plurality of images from the camera. In some examples, the computing device(s) may receive the plurality of images in a live video stream as the camera captures each image.

At operation 710, the process may include calculating at least one of an error or an intrinsic characteristic of the camera based at least in part on the first location and the second location. As discussed above, the error and/or the intrinsic characteristic may be based on reference locations corresponding to the plurality of positions. In such examples, the computing device(s) may calculate the reference locations based on a distortion parameter associated with the camera.

In various examples, the computing device(s) may determine measured locations of the collimated light in each image of the plurality of images. The locations may be based on a center of the collimated light in the image (e.g., centroid or center of mass method). The intrinsic characteristics may include a focal length of the lens and an optical center of the lens, in addition to distortion model coefficients, as described in detail above. The error may include a maximum error calculated between first location and a corresponding reference location and between the second location and the corresponding reference location. In some examples, the error may comprise a root-mean-squared (RMS) error associated with the comparison.

FIG. 8 depicts an example process for calibrating a camera. The camera may be calibrated using a calibration station, as described herein.

At operation 802, the process may include receiving an input corresponding to a parameter associated with the camera. The input may be received by the computing device(s) associated with the camera calibration system. The parameter of the camera may include an exposure (i.e., aperture, shutter speed, ISO speed) of the camera, a type of lens associated with the camera, a field of view of the lens (e.g., horizontal field of view, vertical field of view, etc.), a resolution associated with the camera, or any other known parameters of the camera. In at least one example, the parameter includes the exposure of the camera.

At operation 804, the process may include causing the camera to be adjusted to a first position. In some examples, the first position may be based on the parameter associated with the camera. In some examples, the first position may include a centered position. In such examples, the centered position may be based on a center of convergence of the camera. In various examples, the first position may include a first position of a calibration sequence. In some examples, the first position may comprise, for example, a first pitch and a first yaw. Further at operation 806, the process may determine an associated first undistorted point based on the first position relative to the light source.

At operation 806, the process may include sending a first capture signal to the camera to cause the camera to capture a first image of a collimated light at the first position. In some examples, the first capture signal may include an instruction to send the images to the computing device(s), such as in a live video feed.

At operation 808, the process may include causing the camera to be adjusted to a second position. In some examples, the second position may be determined based on the parameter associated with the camera. In some examples, the second position may include a second position of the calibration sequence. In some examples, the second position may comprise, for example, a second pitch and a second yaw. Further at operation 808, the process may determine an associated second undistorted point based on the second position relative to the light source.

At operation 810, the process may include sending a second capture signal to the camera to cause the camera to capture a second image of the collimated light at the second position.

At operation 812, the process may include receiving the first image and the second image from the camera. In some examples, the computing device(s) may receive the first image and the second image in a live video stream as the camera captures the respective image. In various examples, the computing device(s) may present on a display, a location of the collimated light captured in the first image and the second image.

At operation 814, the process may include calculating at least one of an intrinsic characteristic or an error associated with the camera based at least in part on the first image and the second image. As discussed above, the error and/or the intrinsic characteristic may be based on reference locations corresponding to the plurality of positions.

In various examples, the computing device(s) may determine measured locations of the collimated light in each image of the plurality of images. The locations may be based on a center of the collimated light in the image. As a non-limiting example, the first undistorted point and the second undistorted point may be distorted by assumed intrinsic parameters, yielding first and second distorted points. Errors, in such examples, may comprise differences between such first and second distorted with respect to measured points of the light in the first and second images. Intrinsics may be determined by iteratively altering the intrinsic parameters until errors (residuals) are minimized (e.g., using gradient descent, non-linear least squares, and the like). The intrinsic characteristics may include a focal length of the lens and an optical center of the lens, as well as distortion model coefficients. The error may include a maximum error calculated between first location and a corresponding reference location and between the second location and the corresponding reference location. In some examples, the error may comprise a root-mean-squared (RMS) error associated with the comparison.

In various examples, the computing device(s) may apply a distortion model to the reference locations to minimize the error (e.g., optimization) between the measured locations of the point of light in the images and the respective reference locations. In some examples, optimization may be performed using a two or more distortion models. In such examples, a distortion model that results in the lowest residual error may be selected as the appropriate distortion model to apply for determining intrinsic characteristics of the camera. Based on the application of the distortion model to the reference locations and a comparison of the distorted reference locations to the measured locations, the computing device(s) may determine the intrinsic characteristics of the camera.

EXAMPLE CLAUSES

A: A calibration system comprising: a light source configured to emit a collimated light; a cradle configured to house a camera; one or more processors; and one or more computer-readable media storing instructions executable by the one or more processors, wherein the instructions, when executed, cause the calibration system to perform operations comprising: receiving a parameter associated with the camera; sending a centering signal to adjust the cradle to a centered position; sending a first calibration signal, wherein the first calibration signal causes the camera to adjust to a first position, the first position based at least in part on the parameter and comprising a first pitch and a first yaw; sending a first capture signal to the camera to cause the camera to capture a first image of the collimated light at the first position; sending a second calibration signal, wherein the second calibration signal causes the camera to adjust to a second position, the second position based at least in part on the parameter and comprising a second pitch and a second yaw; sending a second capture signal to the camera to cause the camera to capture a second image of the collimated light at the second position; receiving, from the camera, the first image and the second image; calculating an intrinsic characteristic of a lens of the camera and an error associated with the lens based at least in part on a comparison between a first location of the collimated light in the first image and a first reference location of the collimated light and between a second location of the collimated light in the second image and a second reference location; determining that the error is below a threshold error; and storing the intrinsic characteristic of the lens.

B: The system as paragraph A describes, wherein the collimated light is centered in a lens of the camera at the first position and the second position, the centering being determined based at least in part on a point of convergence associated with the camera C: The system as either paragraph A or B describe, wherein the calculating the intrinsic characteristic of the lens of the camera and is based at least in part on: applying one or more distortions parameters to the first reference location and the second reference location and comparing a first distorted reference location and a second distorted reference location to the first location and the second location, respectively; and minimizing a difference between the first distorted reference location and the first location and the second distorted reference location and the second location based at least in part on altering the one or more distortion parameters.

D: The system as any of paragraphs A-C describe, wherein the light source comprises: a fiber optic cable configured to emit a light; a lens configured to collimate the light into the collimated light; and a beam expander configured to expand a diameter of the collimated light.

E: The system as any of paragraphs A-D describe, wherein the first reference location represents a location corresponding to an expected location of the collimated light at the first position based at least in part on a distortion parameter of the camera and the first position.

F: The system as any of paragraphs A-E describe, wherein the first location and the second location are based at least in part on determining a centroid of the collimated light in the first image and the second image, respectively.

G: A computer-readable medium having thereon computer-executable instructions that, responsive to execution, configure a computer to perform a system as any of paragraphs A-F describe.

H: A method comprising: receiving an input comprising a parameter associated with a camera; causing the camera to be adjusted to a first position; sending a first capture signal to the camera to cause the camera to capture a first image of a collimated light at the first position, wherein the first position is based at least in part on the parameter; causing the camera to be adjusted to a second position; sending a second capture signal to the camera to cause the camera to capture a second image of the collimated light at the second position, wherein the second position is based at least in part on the parameter associated with the camera; and calculating at least one of an intrinsic characteristic of the camera or an error associated with the camera based at least in part on the first image and the second image.

I: The method as paragraph H describes, wherein calculating the at least one of the intrinsic characteristic of the camera or the error associated with the camera comprises: determining a first reference location associated with the collimated light at the first position, wherein the first reference location corresponds to a first expected location of the collimated light at the first position based at least in part on a distortion parameter of the camera and the first position; comparing a first location of the collimated light in the first image and the first reference location; determining a second reference location associated with the collimated light at the second position, wherein the second reference location corresponds to a second expected location of the collimated light at the second position based at least in part on the distortion parameter of the camera and the second position; and comparing a second location of the collimated light in the second image and the second reference location.

J: The method as either of paragraphs H or I describe, wherein the collimated light comprises light: generated by a light source; and collimated by a lens.

K: The method as any of claims H-J describe, wherein the first position and the second position are determined based on a regular spacing in two or more of a pitch, roll, or yaw over a field of view associated with the camera.

L: The method as any of claims H-K describe, wherein the collimated light is substantially centered in a lens of the camera at the first position and the second position.

M: The method as any of claims H-L describe, wherein the intrinsic characteristic of the camera comprises at least one of a focal length of a lens associated with the camera, an optical center of the lens, or one or more coefficients of a distortion model associated with the camera.

N: The method as any of claims H-M describe, wherein the parameter comprises at least one of: an exposure associated with the camera; a type of lens associated with the camera; a field of view of the lens associated with the camera; or a resolution associated with the camera.

O: The method as any of claims H-N describe, further comprising: determining a distortion model based at least in part on the parameter of the camera, wherein calculating the at least one of the intrinsic characteristic or the error is based at least in part on the distortion model.

P: A system or device comprising: a processor; and a computer-readable medium coupled to the processor, the computer-readable medium including instructions to configure the processor to perform a computer-implemented method as any of paragraphs H-P describe.

Q: A system or device comprising: a means for processing; and a means for storing coupled to the means for processing, the means for storing including instructions to configure one or more devices to perform a computer-implemented method as any of paragraphs H-P describe.

R: A computer-readable medium having thereon computer-executable instructions that, responsive to execution, configure a computer to perform a method as any one of paragraphs H-P describe.

S: A non-transitory computer-readable medium storing instructions that, when executed, cause one or more processors to perform operations comprising: causing a camera to be adjusted to a plurality of positions corresponding to a calibration sequence; sending a capture signal to the camera to cause the camera to capture a plurality of images of a collimated light at the plurality of positions, wherein individual images of the plurality of images correspond to individual positions of the plurality of positions; determining a plurality of reference points based at least in part on the plurality of positions; determining a plurality of errors based at least in part on differences between reference locations associated with the plurality of reference points and measured locations associated with one or more centroids in the plurality of corresponding images; and determining a set of intrinsic characteristics of the camera based at least in part on the plurality of errors.

T: The non-transitory computer-readable medium as paragraph S describes, wherein the plurality of positions are based at least in part on a grid having a homogeneous spacing.

U: The non-transitory computer-readable medium as either of paragraphs S or T describe, wherein the plurality of positions are determined based at least in part on a parameter associated with the camera, the parameter comprising at least one of: an exposure associated with the camera; a type of lens associated with the camera; a field of view of the lens associated with the camera; or a resolution associated with the camera.

V: The non-transitory computer-readable medium as any of paragraphs S-U describe, wherein the plurality of positions are determined based at least in part on one or more of a field of view of the camera or a radial distortion of the camera.

W: The non-transitory computer-readable medium as any of paragraphs S-V describe, wherein the determining the plurality of errors comprises: applying a distortion model to the plurality of reference points to determine a plurality of corresponding distorted reference points; and adjusting one or more distortion parameters associated with the distortion model to minimize the differences between the locations associated with the one or more centroids and locations associated with the plurality of distorted reference points.

X: The non-transitory computer-readable medium as paragraph W describes, wherein determining the set of intrinsic characteristics of the camera is further based at least in part on at least one of: determining that a number of iterations of adjustments to the one or more distortion parameters has reached a threshold number of iterations; determining that a rate of change in the differences between the locations associated with the one or more centroids and the locations associated with the plurality of distorted reference points; or determining that a residual error is below a threshold error value.

Y: A system or device comprising: a processor; and the non-transitory computer-readable medium as any of paragraphs S-X describe coupled to the processor.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A calibration system comprising:
    a light source configured to emit a collimated light;
    a cradle configured to house a camera;
    one or more processors; and
    one or more computer-readable media storing instructions executable by the one or more processors, wherein the instructions, when executed, cause the calibration system to perform operations comprising:
        receiving a parameter associated with the camera;
        sending a centering signal to adjust the cradle to a centered position;
        sending a first calibration signal, wherein the first calibration signal causes the camera to adjust to a first position, the first position based at least in part on the parameter and comprising a first pitch and a first yaw;
        sending a first capture signal to the camera to cause the camera to capture a first image of the collimated light at the first position;
        sending a second calibration signal, wherein the second calibration signal causes the camera to adjust to a second position, the second position based at least in part on the parameter and comprising a second pitch and a second yaw;
        sending a second capture signal to the camera to cause the camera to capture a second image of the collimated light at the second position;
        receiving, from the camera, the first image and the second image;
        calculating an intrinsic characteristic of a lens of the camera and an error associated with the lens based at least in part on a comparison between a first location of the collimated light in the first image and a first reference location of the collimated light and between a second location of the collimated light in the second image and a second reference location;
        determining that the error is below a threshold error; and
        storing the intrinsic characteristic of the lens.

2. The calibration system of claim 1, wherein the collimated light is centered in the lens of the camera at the first position and the second position, the centering being determined based at least in part on a point of convergence associated with the camera.

3. The calibration system of claim 1, wherein the calculating the intrinsic characteristic of the lens of the camera and is based at least in part on:
    applying one or more distortions parameters to the first reference location and the second reference location and comparing a first distorted reference location and a second distorted reference location to the first location and the second location, respectively; and minimizing a difference between the first distorted reference location and the first location and the second distorted reference location and the second location based at least in part on altering the one or more distortion parameters.

4. The calibration system of claim 1, wherein the lens is a first lens, and wherein the light source comprises:
 a fiber optic cable configured to emit a light;
 a second lens configured to collimate the light into the collimated light; and
 a beam expander configured to expand a diameter of the collimated light.

5. The calibration system of claim 1, wherein the first reference location represents a location corresponding to an expected location of the collimated light at the first position based at least in part on a distortion parameter of the camera and the first position.

6. The calibration system of claim 1, wherein the first location and the second location are based at least in part on determining a centroid of the collimated light in the first image and the second image, respectively.

7. A method comprising:
 receiving an input comprising a parameter associated with a camera;
 causing the camera to be adjusted to a first position;
 sending a first capture signal to the camera to cause the camera to capture a first image of a collimated light at the first position, wherein the first position is based at least in part on the parameter;
 causing the camera to be adjusted to a second position;
 sending a second capture signal to the camera to cause the camera to capture a second image of the collimated light at the second position, wherein the second position is based at least in part on the parameter associated with the camera; and
 calculating at least one of an intrinsic characteristic of the camera or an error associated with the camera based at least in part on the first image and the second image.

8. The method of claim 7, wherein calculating the at least one of the intrinsic characteristic of the camera or the error associated with the camera comprises:
 determining a first reference location associated with the collimated light at the first position, wherein the first reference location corresponds to a first expected location of the collimated light at the first position based at least in part on a distortion parameter of the camera and the first position;
 comparing a first location of the collimated light in the first image and the first reference location;
 determining a second reference location associated with the collimated light at the second position, wherein the second reference location corresponds to a second expected location of the collimated light at the second position based at least in part on the distortion parameter of the camera and the second position; and
 comparing a second location of the collimated light in the second image and the second reference location.

9. The method of claim 7, wherein the collimated light comprises light:
 generated by a light source; and
 collimated by a lens.

10. The method of claim 7, wherein the first position and the second position are determined based on a regular spacing in two or more of a pitch, roll, or yaw over a field of view associated with the camera.

11. The method of claim 7, wherein the collimated light is substantially centered in a lens of the camera at the first position and the second position.

12. The method of claim 7, wherein the intrinsic characteristic of the camera comprises at least one of a focal length of a lens associated with the camera, an optical center of the lens, or one or more coefficients of a distortion model associated with the camera.

13. The method of claim 7, wherein the parameter comprises at least one of:
 an exposure associated with the camera;
 a type of lens associated with the camera;
 a field of view of the lens associated with the camera; or
 a resolution associated with the camera.

14. The method of claim 7, further comprising:
 determining a distortion model based at least in part on the parameter of the camera,
 wherein calculating the at least one of the intrinsic characteristic or the error is based at least in part on the distortion model.

15. A non-transitory computer-readable medium storing instructions that, when executed, cause one or more processors to perform operations comprising:
 causing a camera to be adjusted to a plurality of positions corresponding to a calibration sequence;
 sending a capture signal to the camera to cause the camera to capture a plurality of images of a collimated light at the plurality of positions, wherein individual images of the plurality of images correspond to individual positions of the plurality of positions;
 determining a plurality of reference points based at least in part on the plurality of positions;
 determining a plurality of errors based at least in part on differences between reference locations associated with the plurality of reference points and measured locations associated with one or more centroids in the plurality of corresponding images; and
 determining a set of intrinsic characteristics of the camera based at least in part on the plurality of errors.

16. The non-transitory computer-readable medium of claim 15, wherein the plurality of positions are based at least in part on a grid having a homogeneous spacing.

17. The non-transitory computer-readable medium of claim 15, wherein the plurality of positions are determined based at least in part on a parameter associated with the camera, the parameter comprising at least one of:
 an exposure associated with the camera;
 a type of lens associated with the camera;
 a field of view of the lens associated with the camera; or
 a resolution associated with the camera.

18. The non-transitory computer-readable medium of claim 15, wherein the plurality of positions are determined based at least in part on one or more of a field of view of the camera or a radial distortion of the camera.

19. The non-transitory computer-readable medium of claim 15, wherein the determining the plurality of errors comprises:
 applying a distortion model to the plurality of reference points to determine a plurality of corresponding distorted reference points; and
 adjusting one or more distortion parameters associated with the distortion model to minimize the differences between the locations associated with the one or more centroids and locations associated with the plurality of distorted reference points.

20. The non-transitory computer-readable medium of claim 19, wherein determining the set of intrinsic characteristics of the camera is further based at least in part on at least one of:

determining that a number of iterations of adjustments to the one or more distortion parameters has reached a threshold number of iterations;

determining that a rate of change in the differences between the locations associated with the one or more centroids and the locations associated with the plurality of distorted reference points; or determining that a residual error is below a threshold error value.

\* \* \* \* \*